United States Patent
Blum et al.

(10) Patent No.: US 8,101,242 B2
(45) Date of Patent: Jan. 24, 2012

(54) METHOD OF IMPARTING CORROSION RESISTANCE TO A SUBSTRATE SURFACE, AND COATED SUBSTRATES PREPARED THEREBY

(75) Inventors: Yigal D. Blum, San Jose, CA (US);
David K. Hui, San Francisco, CA (US);
David Brent MacQueen, Foster City, CA (US)

(73) Assignee: SRI International, Menlo Park, CA (US)

( * ) Notice: Subject to any disclaimer, the term of this patent is extended or adjusted under 35 U.S.C. 154(b) by 490 days.

(21) Appl. No.: 12/398,363

(22) Filed: Mar. 5, 2009

(65) Prior Publication Data
US 2009/0226742 A1 Sep. 10, 2009

Related U.S. Application Data

(63) Continuation-in-part of application No. 12/330,319, filed on Dec. 8, 2008, now abandoned.

(60) Provisional application No. 61/034,826, filed on Mar. 7, 2008.

(51) Int. Cl.
*B05D 3/02* (2006.01)

(52) U.S. Cl. ............................ 427/387; 427/379

(58) Field of Classification Search .................. None
See application file for complete search history.

(56) References Cited

U.S. PATENT DOCUMENTS

| | | |
|---|---|---|
| 3,944,587 A | 3/1976 | Katsushima et al. |
| 3,979,546 A | 9/1976 | Lewis |
| 4,301,197 A | 11/1981 | Franz et al. |
| 4,591,652 A | 5/1986 | DePasquale et al. |
| 4,788,309 A | 11/1988 | Laine et al. |
| 4,801,439 A | 1/1989 | Blum et al. |
| 4,952,715 A | 8/1990 | Blum et al. |
| 4,954,539 A | 9/1990 | Cavezzan et al. |
| 4,983,459 A | 1/1991 | Franz et al. |
| 4,997,684 A | 3/1991 | Franz et al. |
| 5,008,422 A | 4/1991 | Blum et al. |
| 5,017,529 A | 5/1991 | Blum et al. |
| 5,055,431 A | 10/1991 | Blum et al. |
| 5,128,494 A | 7/1992 | Blum |
| 5,229,481 A * | 7/1993 | Tilley .............................. 528/10 |
| 5,246,738 A | 9/1993 | Blum |
| 5,319,121 A | 6/1994 | Blum |
| 5,322,913 A | 6/1994 | Blum et al. |
| 5,405,655 A | 4/1995 | Blum et al. |
| 5,635,250 A | 6/1997 | Blum et al. |
| 5,639,844 A | 6/1997 | Blum et al. |

(Continued)

OTHER PUBLICATIONS

Abe, Y. et al. (1995) "Preparation and Properties of Flexible Thin Films by Acid-Catalyzed Hydrolytic Polycondensation of Methyltrimethoxysilane," *J. Poly. Sci. A: Poly. Chem.* 33:751-754.

Blum, Y.D. et al. (2001) "Modifications of Hydrosiloxane Polymers for Coating Applications," *Surf. Coat. Int. B: Coat. Trans.* 84(B1):27-33.

Blum, Y.D. et al. (1999) "Modifications of Preceramic Polymers Suitable for Corrosion Resistant and High Temperature Coatings," *Mat. Res. Soc. Symp. Proc.* 576:281-286.

(Continued)

*Primary Examiner* — Erma Cameron
(74) *Attorney, Agent, or Firm* — Isaac M. Rutenberg; Bozicevic, Field & Francis LLP

(57) ABSTRACT

The disclosure provides methods and materials for imparting corrosion resistance to a substrate, as well as the corrosion-resistant substrates prepared accordingly. Compositions and methods include nonpyrolyzed, silicon-based polymer coatings prepared on substrates. The prepared coatings are highly stable and resistant to corrosion. The invention finds utility, for example, in the fields of surface and coating chemistry.

16 Claims, 1 Drawing Sheet

U.S. PATENT DOCUMENTS

| | | | |
|---|---|---|---|
| 5,750,643 | A | 5/1998 | Blum et al. |
| 5,919,572 | A | 7/1999 | Blum et al. |
| 5,973,068 | A | 10/1999 | Yamaya et al. |
| 5,990,024 | A | 11/1999 | Blum et al. |
| 6,045,873 | A | 4/2000 | Adachi et al. |
| 6,114,440 | A | 9/2000 | Yamaya et al. |
| 6,133,396 | A * | 10/2000 | Laine et al. ............ 528/31 |
| 6,624,237 | B2 | 9/2003 | Biteau et al. |
| 6,652,978 | B2 | 11/2003 | Lukacs, III et al. |
| 7,052,770 | B2 | 5/2006 | Furuya et al. |
| 2002/0011439 | A1 * | 1/2002 | Blum et al. ............ 210/490 |
| 2008/0085373 | A1 * | 4/2008 | Karshtedt et al. ............ 427/487 |

OTHER PUBLICATIONS

Furuya, M. et al. (1995) "Organosiloxane Resin with High Silanol Content," *Silicones in Coatings II (Conf. Proc., Paint Res. Assoc)*, Paper 8, pp. 1-5.

Gunji, T. et al. (2004) "Preparation and Properties of Alkoxy(methyl)silsesquioxanes as Coating Agents," *J. Poly. Sci. A: Poly. Chem.* 42:3676-3684.

Torrey, J.D. et al. (2006) "Composite Polymer Derived Ceramic System for Oxidizing Environments," *J. Mater. Sci.* 41:4617-4622.

U.S. Appl. No. 12/330,319, filed Dec. 8, 2008, Blum.

U.S. Appl. No. 12/916,307, filed Oct. 29, 2010, Blum, et al.

\* cited by examiner

METHOD OF IMPARTING CORROSION RESISTANCE TO A SUBSTRATE SURFACE, AND COATED SUBSTRATES PREPARED THEREBY

CROSS REFERENCE TO RELATED APPLICATIONS

This application is a continuation-in-part of, and claims priority to, U.S. patent application Ser. No. 12/330,319, filed Dec. 8, 2008, and now abandoned. This application also claims priority under 35 U.S.C. §119(e)(1) to U.S. Provisional Patent Application Ser. No. 61/034,826, filed Mar. 7, 2008. The contents of the aforementioned applications are incorporated herein by reference.

TECHNICAL FIELD

This disclosure relates generally to compositions and methods useful in providing nonpyrolyzed coatings on substrates consisting of inorganic silicon based backbone. The invention finds utility, for example, in the fields of surface and coating chemistry.

BACKGROUND

The present invention is directed to protective coatings, which may be provided on a wide variety of substrate types, and which are both stable at high temperatures and, in the case of metal substrates, corrosion-resistant. Although a number of materials and procedures for making coatings are known in the art, there remains a need for coatings, which are chemically and physically stable to heat and do not corrode over time. There is a need for better and more durable heat and/or corrosion resistance coatings on various metallic surfaces. For an instance, corrosion resistance coatings that do not degrade by UV radiation (weathering) are highly desired. There is a need for such protective coatings that are also hard and scratch resistant, and bond strongly (preferably chemically bonded) to various substrates. There is also a need for coatings that provide better resistant to corrosive acids.

Further, many prior art techniques involve very long curing times, very high deposition or curing temperatures and/or vacuum processing, limiting ease of manufacturability especially for large parts. Frequently, there are trade-offs between the various desired characteristics of flexibility, hardness, and coating adhesion. In addition, most coatings which exhibit any of the aforementioned properties do not provide "release surfaces," i.e., they do not repel water and oil based liquids.

Some organometallic, inorganic and fluoroorganic polymers are known for their thermal stability. Certain polysiloxanes, for example, have been the most widely commercialized of these polymers, but there has been nothing to suggest that such polymers would be useful to make high temperature coatings for performance above 250° C., which is already well above the performance of conventional organic based coatings, with the exception of a few polymers that were found to be costly to manufacture and therefore, their usage is limited to low volume and very special applications. Polysiloxanes have typically been used as high temperature oils and elastomers, as well as soft elastomeric coatings used as antifouling, waterproofing, and soil-resistance coatings. Organosilicon resins such as T-structured silsesquioxane and MQ resins are used as high-temperature, hard coatings, but their bonding to substrates is known to be problematic and their curing must be performed at relatively high temperature (150 to 300° C.). They are also expensive. The high temperature application of the elastomeric silicones is typically limited to 250° C.

Some polysilsequioxanes are formed "in-situ" by hydrolysis-condensation reactions of $RSi(OR')_3$, where R is typically methyl, vinyl or phenyl and R' is methyl, ethyl, propyl, or propyl as reviewed by R. Baney et. al. (Chem. Rev. 95, 1409-1430 (1995)) and for example, reported by M. Furuya et. al., in Silicones in Coatings II, Paper 8 (Conference proceedings, Paints Research Association, Teddington, UK, 1998). The formed resins have no linear structure segments and contain many cages and T units (crosslinking units) with the approximate structure of $[RSiO_{1.2}]_a[RSi(OH)O]_b[RSi(OR)O]_c$ wherein b is typically below 0.1 to prevent undesired crosslinking before processing. In most silsesquioxane cases c is also below 0.1 and a is the predominant feature forming cage structures. These resins have relatively high viscosities as melts or in solutions. They have very limited shelf stability and tend to gel due to their non-linear structure and the presence of acid or base catalyst incorporated to the reaction solution to activate the hydrolysis-condensation reaction.

Polyphosphazenes belong to another category of inorganic polymers with potential stability at temperatures of 400° C. or higher. Again, there has not been any suggestion that such polymers could be used as good high temperature protective coatings; most research efforts have concentrated on the elastomeric, electrical or optical properties of the polymers. These polymers were never commercialized in large scale due to high manufacturing costs and processing difficulties.

Still another family of polymers, which have been used to provide oxidation-resistant and corrosion-resistant coatings, are fluorocarbons such as tetrafluoroethylene, commercially available as TEFLON® and fluoropolyvinyledene. Information concerning tetrafluoroethylene polymers may be found, inter alia, in U.S. Pat. No. 2,230,654 to Plunkett, issued Feb. 4, 1941. Tetrafluoroethylene coatings, however, like coatings prepared from numerous other poly(fluorocarbons), have limited stability at temperatures above about 300° C. When decomposed at high temperature, they can release hazardous HF and oxidized fluorocarbon compounds that are suspected to be carcinogenic. Their bonding to surfaces is very problematic; they tend to be soft and are considerably expensive.

A different approach for protecting metal surfaces against corrosion at high temperatures and in harsh environments is by the application of ceramic coatings. Ceramic coatings can be fabricated at the surface of metals as uniform, hermetically sealed layers that are well-bonded to the substrate. This approach provides another method of protecting metals against chemical attack. However, only thin films can be formed by a single-layer deposition and defects without cracking. Additionally, the equipment, which has typically been necessary to prepare ceramic coatings, is costly, usually consisting of high vacuum chambers which can only process substrates of a limited size, and the process requires deposition times which are often long.

Thick ceramic coatings can be deposited by thermal and plasma spray techniques. However, these coatings have many defects (cracks, pinholes, voids) that reduce their integrity and make such coatings primarily used for thermal barrier purposes.

Preceramic polymers that can be fabricated like organic polymers and then cured and pyrolyzed to give ceramic products are being developed as an alternative for processing advanced ceramics. Very thin ceramic coatings (0.01 to 0.5 μm thick) can be made by simple wet techniques using solutions of organometallic precursors, provided that the substrate is stable at the pyrolysis temperature (400 to 1000° C.).

The developed coatings are hard, very stable at high temperatures, and provide protection against corrosion, but only to a certain extent due to their limited thickness. These coatings lack flexibility because their extensive crosslinking network results in a high modulus of elasticity. Thick layers (on the order of 4 μm or greater, more typically in the range of about 10 μm to 50 μm) cannot be obtained by a single deposition operation using preceramic polymers because the coatings tend to crack as a result of the drastic shrinkage that occurs during conversion of the polymer to a ceramic network and, further, because of a mismatch in the expansion coefficient between the coating and substrate. It is possible to limit shrinkage to one dimension, vertical to the surface, only when fabricating relatively thin layers (less than 0.5 μm). Alternatively, the addition of inert and reactive fillers to the coating formulation can be practice to obtain thick coatings, based on concepts that are described, for example, in U.S. Pat. No. 5,635,250.

The following references relate generally to polymeric coatings which are thermally and chemically stable and/or nonwetting, and to polymers which can be used to prepare such coatings.

U.S. Pat. No. 3,944,587 to Katsushima et al. describes certain hydroxypolyfluoroalkyl-containing silane derivatives as water- and oil-repellent agents. The reference states that a variety of material types may be rendered water- and oil-repellent by applying coatings of the disclosed silane derivatives. The silane compounds react with the substrate surface to provide the water- and oil-repellent coatings.

U.S. Pat. No. 3,979,546 to Lewis describes a method for rendering inorganic substrates hydrophobic which involves treating the substrate surface with alkoxy-omega-siloxanols. The siloxanols are prepared by reacting selected cyclic siloxanes with alcohols.

U.S. Pat. No. 4,301,197 to Franz et al. describes the use of selected poly(alkyl hydrogen siloxanes) to treat glass surfaces to improve the release of polymeric materials.

U.S. Pat. No. 4,591,652 to DePasquale et al. describes certain polyhydroxyl silanes or siloxanes as useful in preparing coatings on metal or glass. The coatings are prepared by curing at temperatures in the range of 90° C. to 150° C.

U.S. Pat. No. 4,954,539 to Cavezzan et al. describes thin films of an aqueous silicone emulsion crosslinked by a monochelate of pentacoordinated tin and cured at temperatures in the range of 80° C. to 220° C. The films are stated to be water-repellent and/or nonadhesive.

U.S. Pat. Nos. 4,983,459 and 4,997,684 to Franz et al. describes treatment of a glass surface with a combination of a perfluoroalkyl alkyl silane and a fluorinated olefin telomer to provide a nonreactive, nonwetting surface.

P. Hergenrother, *Angew. Chem. Int. Ed. Engl.* 29:1262-1268 (1990), generally relates to thermally stable polymers—including polyimides, poly(aryl ethers) and imide/aryl ether copolymers—and their potential uses.

Silicon-containing polymers are described as potentially useful materials in environments which require thermal stability and oxidation-resistance by R. E. Burks, Jr., et al., J. Poly. Sci. 11:319-326 (1973), C. U. Pittman, Jr., et al., J. Poly. Sci. 14:1715-1734 (1976), and P. Dvornic et al., Polymer 24:763-767 (1983).

U.S. Pat. Nos. 5,405,655 and 5,919,572 describe temperature-resistant and/or nonwetting coatings of cured, silicon-containing polymers. The disclosures of these patents describe, for example, substrates having a nonwetting, non-pyrolyzed coating thereon, and methods for providing a thermally stable, non-pyrolyzed coating on a substrate.

U.S. Pat. No. 6,045,873 describes the use of metal flakes in coatings as a method for inhibiting white rust which may be caused by outdoor exposure.

Despite recent advances, there remains a need in the art for adequately adhered, thermally stable, non-pyrolyzed polymeric coatings that are suitable for use in a wide variety of applications. An ideal coating material combines high thermal stability, desirable wetting properties during deposition on various surfaces, good adhesion to substrate, preferably via chemical bonding, resistance to corrosion and chemical degradation such as oxidation, good barrier properties, ease of application, and low cost of production and application. Adequate shelf stability and appropriate duration for applying the formulations (which may be activated to promote curing) as coatings are also critical for practical commercial purposes.

The present invention is directed at addressing one or more of the abovementioned drawbacks, as well as similar issues pertaining to surface coatings.

Selected silicon-containing polymers according to the disclosure can be used to prepare coatings, which overcome some or all of the disadvantages of the prior art and meet some or all of the above-mentioned criteria, i.e., the coatings provided by the method described herein bond well to many substrates and are heat-stable, rapidly cured at relatively low temperatures and in some instances, even at room temperature, display excellent hardness and adhesion, and provide corrosion and/or scratch resistance protection including applications at temperature over 350° C. Additionally, the coatings may be prepared under conditions which render them nonwetting (for waterproofing and soil resistance). Such coatings can be used in their polymeric stage or after pyrolyzing the polymer component to ceramic in high conversion yield.

SUMMARY OF THE DISCLOSURE

The present disclosure describes compositions and methods for the preparation of thermally stable, protective non-pyrolyzed coatings that may be produced and processed at low cost.

In one embodiment, the disclosure provides a method for coating a substrate surface, the method comprising: (a) applying to the substrate a coating formulation comprising: (i) a soluble, substantially stable and non-gelled, curable silicon-containing polymer prepared by the reaction of: (1) a precursor polymer comprising units having the structural formula (I)

wherein $R^1$ is $C_1$-$C_{30}$ hydrocarbyl (as defined in more detail herein and including, for example, $C_1$-$C_{30}$ alkyl, $C_5$-$C_{30}$ aryl, $C_6$-$C_{30}$ aralkyl, and $C_6$-$C_{30}$ alkaryl, each of which is optionally substituted and optionally heteroatom containing) and optionally comprising units having the structure of formula (II)

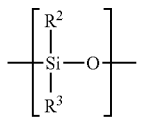

(II)

wherein each $R^2$ and $R^3$ is independently selected from H, $C_1$-$C_{30}$ hydrocarbyl, organometallic, halocarbyl, and organosilyl, each of which is optionally substituted and is optionally heteroatom containing; with (2) a second reagent selected from $H_2O$, an alcohol having the structure $R^{10}OH$, a mixture of alcohols each having the structure $R^{10}OH$, and combinations thereof, wherein each $R^{10}$ is independently selected from hydrocarbyl, halocarbyl, organometallic, and organosilyl, each of which is optionally substituted and is optionally heteroatom containing; in the presence of (3) a dehydrocoupling catalyst effective to convert at least about 20% and preferably above 90% of the Si—H groups to Si—O— groups, provided that no more than 50% of the newly formed Si—O bonds of the uncured silicon-containing polymer product units have the structure —[Si($R^1$)$O_{1.5}$]—; and (4) an optional additional inert solvent; (ii) an optional particulate filler or other additive; and (iii) an optional compatible solvent (including mixtures of solvents); and (b) curing the applied coating formulation at a curing temperature for a predetermined curing time and optionally in the presence of a curing catalyst, wherein the curing temperature is below the temperature required for pyrolysis and conversion of the silicon-containing polymer to a ceramic product.

For example, the reaction for preparing the curable silicon-containing polymer may comprises a hydrosilylation reaction, wherein the hydrosilylation reaction comprises reacting the precursor polymer with one or more alkenyl-containing reagents or carbonyl containing reagents in the presence of a hydrosilylation catalyst, and wherein the hydrosilylation reaction converts between 1% and 50% of the Si—H groups to Si—R or Si—OR groups, wherein R is selected from hydrocarbyl, heteroatom containing hydrocarbyl, substituted heteroatom containing hydrocarbyl, halocarbyl, organometallic, and organosilyl. The optional hydrosilylation catalyst and the dehydrocoupling catalyst can be the same compound or different compounds.

In a further embodiment, the disclosure provides a polymer formulation comprising (i) a soluble, substantially stable and non-gelled, curable silicon-containing polymer comprising repeat units selected from the structural formulae (III)-(VI)

    (III)

    (IV)

    (V)

    (VI)

    (VII)

wherein: k, m, n, p and q represent the fraction of repeat units of the silicon-containing polymer that have the structural formula (III), (IV), (V), (VI), and (VII) respectively, provided that: (a) n has a value between 0 and about 0.5; (b) q has a value between 0 and about 0.8; (c) m has a value between 0 and about 0.5; (d) k has a value between 0.05 and 0.95; and (e) p has a value that is less than about 0.1 if a catalyst capable of activating Si—H bond (e.g, an active dehydrocoupling catalyst) and curing agent or functional group are present in the formulation, and less than 1 (preferably less than 0.8) otherwise; $R^1$, $R^2$, and $R^3$ are as defined previously; and $R^{10}$ is selected from hydrocarbyl and organosilyl; (ii) an optional solvent capable of preventing or significantly slowing the condensation of Si—OH to Si—O—Si; (iii) an optional particulate filler and/or other additives; and (iii) an optional curing catalyst.

In a still further embodiment, the disclosure provides a method for coating a substrate surface, the method comprising: (a) applying to the substrate the polymer solution comprising a soluble, substantially stable and non-gelled, curable silicon-containing polymer comprising repeat units selected from the structural formulae (III)-(VI); and (b) drying and curing the coating formulation applied in (a) at a temperature $T_1$ for a predetermined period of time and optionally at Temperature $T_2$ in the presence or the absence of a curing catalyst, wherein the required $T_2$ is lower or equal to $T_1$ and $T_1$ and $T_2$ are below the temperature required for pyrolysis of the silicon-containing polymer.

In a still further embodiment, the disclosure provides a coated substrate prepared according to any of the methods of the invention.

In a still further embodiment, the disclosure provides a coated substrate comprising a substrate and a coating disposed thereon, wherein the coating comprises: (i) a cured silicon-containing material; and (2) an optional filler material. The cured silicon-containing material comprises repeat units having the structure of formula (III), (V), (VI), (VII), or combinations thereof:

    (III)

    (V)

    (VI)

    (VII)

wherein: k1, n1, p1 and q1 represent the fraction of repeat units of the silicon-containing material that have the structural formula (III), (V), (VI), and (VII) respectively, provided that: (a) n1 has a value between about 0.3 and about 0.95; (b) q1 has a value between 0 and about 0.8; (c) k1 has a value between 0 and about 0.5; and (d) p1 has a value that is less than 0.8; $R^1$ is $C_1$-$C_{30}$ hydrocarbyl which is optionally substituted and is optionally heteroatom containing; and $R^2$ and $R^3$ are independently selected from H, $C_1$-$C_{30}$ hydrocarbyl, organometallic, halocarbyl, and organosilyl, each of which is optionally substituted and is optionally heteroatom-containing.

DETAILED DESCRIPTION OF THE INVENTION

Figure 1:
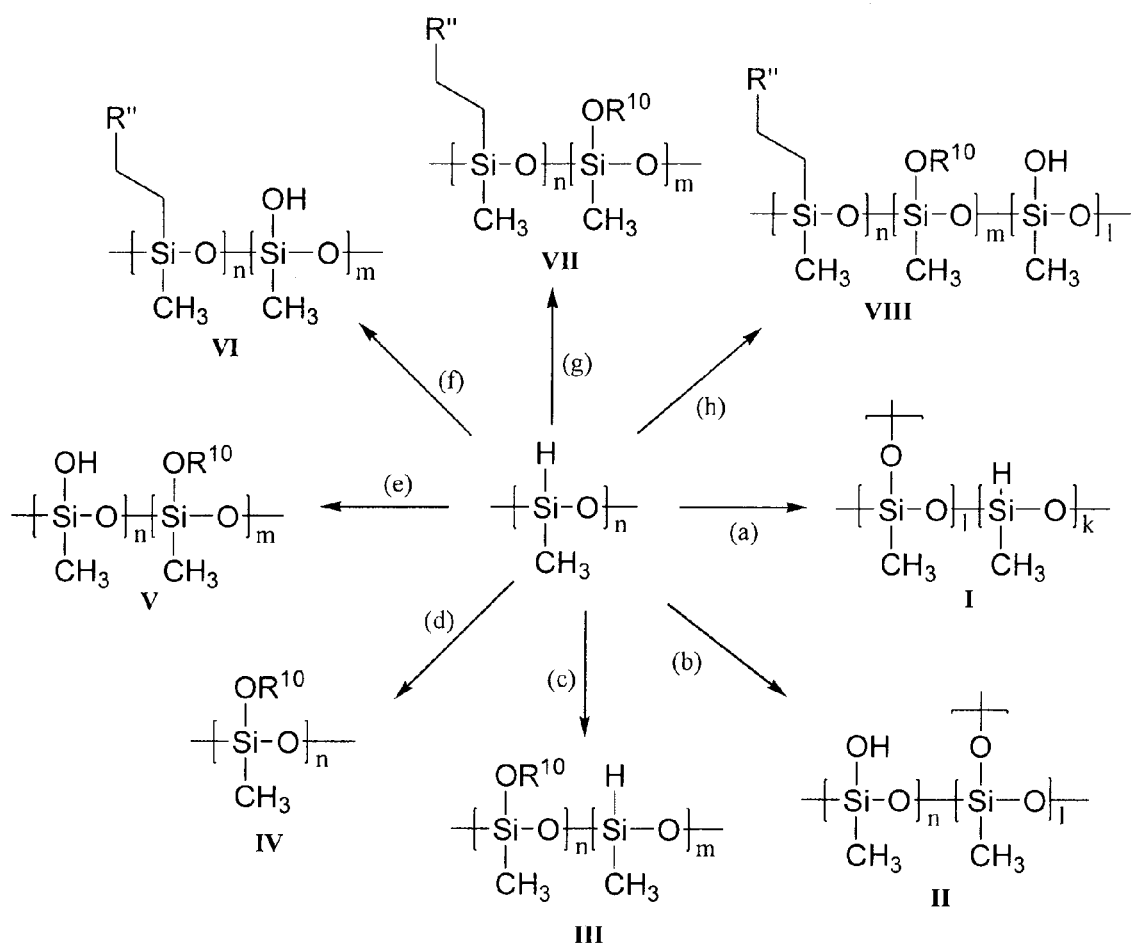
FIG. 1 provides examples of reactions that may be used to prepare some of the compounds described herein.

Before the present methods, polymers, and coatings are disclosed and described, it is to be understood that this invention is not limited to specific polymers or coating conditions, as such may, of course, vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "a silicon-containing polymer" includes mixtures of such polymers, reference to "a coating" includes multiple layers of coatings, and the like.

As used herein, the terms "may," "optional," "optionally," or "may optionally" mean that the subsequently described circumstance may or may not occur, so that the description includes instances where the circumstance occurs and instances where it does not. For example, the phrase "optionally substituted alkyl group" means that the alkyl group may or may not be substituted and that the description includes both unsubstituted alkyl and alkyl where there is substitution. Similarly, a process which is "optionally" carried out in the present of a particular chemical agent means that such an agent may or may not be present.

Unless defined otherwise, all technical and scientific terms used herein have the meaning commonly understood by one of ordinary skill in the art to which the invention pertains. Although any methods and materials similar or equivalent to those described herein may be useful in the practice or testing of the present invention, preferred methods and materials are described below. Specific terminology of particular importance to the description of the present invention is defined below.

The term "thermally stable" as used herein refers to a coating which is chemically and physically stable at temperatures up to about 400° C. after being cured i.e., a coating which neither decomposes to an inorganic ceramic material nor volatilizes significantly to the gaseous state at temperatures below about 400° C.

The term "pyrolysis" as used herein refers to the conversion of an organic containing material, such as preceramic polymer consisting of an inorganic skeleton and organic functional groups, to an inorganic material. Generally, the coatings of the invention are not prepared pyrolitically, although they may in some cases be prepared in such a way as to undergo partial, low temperature (<300° C.) pyrolytic reactions.

The term "corrosion resistant" as used herein refers to a coating on a substrate, which prevents or reduces the corrosion of the substrate when exposed to air, corrosive gases, heat, water, or corrosive environments for prolonged time periods.

The term "nonwetting" as used herein refers to a substrate surface, which has a very low compatibility with liquids, due to low surface tension. The term "nonwetting" may refer to hydrophobic and waterproofing characteristics, or to oleophobic characteristics.

The terms "hard" and "hardness" refer to measure of scratch resistance for a coating. Typically, coatings of the disclosure that are "hard" provide scratch resistance and have typical hardness greater than 2H and preferably greater than 5H in a scale extending from 9B to 0B, HB, F and 0H to 9H, wherein 5B is the softest and 9H is the hardest available pencils.

The terms "cure" and "curing" as used herein refer to a process of modifying a material from a pre-cure state to a post-cure state. Where the material being cured is a polymeric material, the curing process typically refers to increasing the molecular weight by chemical networking individual polymers into an infinite structure of the polymer such as by introducing crosslinks (either physical or chemical). The curing converts a polymeric material having softening or melting point or having solubility into a non-meltable and non-soluble material. Curing of polymers may be affected by any suitable process including application of heat, activation of a curing catalyst, introduction of a crosslinking initiator and/or adding a curing agent. Where the material being cured is a non-polymeric material, the curing process typically (but not necessarily) refers to polymerization of the material. Any suitable process for initiating or affecting polymerization may be used, including thermal, chemical, and electromagnetic (e.g., UV) initiation. The terms "cure" and "curing" are used herein in a non-limiting sense, and as will be understood by the skilled artisan, its meaning may vary depending upon the material that is being cured.

The term "cured," when referring to a polymer, indicates a polymer that has been crosslinked by itself or in the presence of a crosslinking agent to the degree that it is substantially unsoluble and/or unmeltable. At the cured stage the polymer becomes "gelled" and also defined as "thermoset".

The term "uncured," when referring to a polymer, indicates a substantially soluble and/or meltable polymer that, for example, can be processed and then cured by self crosslinking groups or by reacting with external curing additives and crosslinkers.

The term "alkyl" as used herein refers to a branched, unbranched or cyclic saturated hydrocarbon group of 1 to about 26 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein may contain 1 to about 16, more typically 1 to 10, carbon atoms. The term "lower alkyl" intends an alkyl group of 1 to 6 carbon atoms, preferably 1 to 4 carbon atoms. The alkyl groups present on the polymers described herein may be unsubstituted or they may be substituted with one or more substituents including functional groups (e.g., amine, hydroxyl, an olefinic group such as a vinyl or an allyl group), or the like. "Substituted alkyl" refers to alkyl substituted with one or more substituent groups, and this includes instances wherein two hydrogen atoms from the same carbon atom in an alkyl substituent are replaced, such as in a carbonyl group (i.e., a substituted alkyl group may include a —C(=O)— moiety). Other substituents include halogen, ether, hydroxyl, amine functional groups, etc. as defined in more detail below. The terms "heteroatom-containing alkyl" and "heteroalkyl" refer to an alkyl substituent in which at least one carbon atom is replaced with a heteroatom, such as O, S, P, or N, as described in further detail infra. If not otherwise indicated, the terms "alkyl" and "lower alkyl" include linear, branched, cyclic, unsubstituted, substituted, and/or heteroatom-containing alkyl or lower alkyl, respectively The term "alkylene" as used herein refers to a difunctional saturated branched or unbranched hydrocarbon chain containing from 1 to 26 carbon atoms. "Lower alkylene" refers to alkylene linkages containing from 1 to 6 carbon atoms, and includes, for example, methylene (—CH$_2$—), ethylene (—CH$_2$CH$_2$—), propylene (—CH$_2$CH$_2$CH$_2$—), 2-methyl-propylene (—CH$_2$—CH(CH$_3$)—CH$_2$—), hexylene (—(CH$_2$)$_6$—) and the like.

The term "alkenyl" as used herein refers to a linear, branched or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Generally, although again not necessarily, alkenyl groups herein may contain 2 to about 18 carbon atoms, and for example may contain 2 to 12 carbon atoms. The term "lower alkenyl" intends an alkenyl group of 2 to 6 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively. Similarly, the term "olefin," as in an "olefinic compound" as used herein refers to a mono-unsaturated or di-unsaturated hydrocarbon of 2 to 12 carbon atoms, wherein in preferred embodiments a carbon-carbon double bond is positioned between the terminal 2 carbon atoms. Preferred olefinic groups within this class are sometimes herein designated as "lower olefinic groups," intending a hydrocarbon containing 2 to 18 carbon atoms containing a single terminal double bond. The latter moieties may also be termed "lower alkenyl." In some cases, it is a part of a silicon containing compound. Typically, but not necessarily, compounds containing olefinic groups are in a liquid form during use in the methods of the disclosure.

The term "alkynyl" as used herein refers to a linear or branched hydrocarbon group of 2 to 24 carbon atoms containing at least one triple bond, such as ethynyl, n-propynyl, and the like. Generally, although again not necessarily, alkynyl groups herein may contain 2 to about 18 carbon atoms, and such groups may further contain 2 to 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" refers to an alkyl group bound through an oxygen linkage. In some embodiments, the alkyl group binds through the oxygen linkage to a non-carbon element, typically to a silicon atom in this disclosure. "Lower alkoxy" intends an alkoxy group containing 1 to 10, more preferably 1 to 7, carbon atoms.

The term "aryl" as used herein refers to an aromatic species having 1 to 3 rings, but typically intends a monocyclic or bicyclic moiety, e.g., phenyl or 1- or 2-naphthyl groups. Optionally, these groups are substituted with 1 to 4, more preferably 1 to 2, substituents such as those described herein, including lower alkyl, lower alkoxy, hydroxyl, amino, and/or nitro. Aryl groups may, for example, contain 6 to 20 carbon atoms, and as a further example, aryl groups may contain 6 to 12 carbon atoms. For example, aryl groups may contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituent, in which at least one carbon atom is replaced with a heteroatom, as will be described in further detail infra. If not otherwise indicated, the term "aryl" includes unsubstituted, substituted, and/or heteroatom-containing aromatic substituents.

The term "aralkyl" refers to an alkyl group with an aryl substituent, and the term "alkaryl" refers to an aryl group with an alkyl substituent, wherein "alkyl" and "aryl" are as defined above. In general, aralkyl and alkaryl groups herein contain 6 to 30 carbon atoms. Aralkyl and alkaryl groups may, for example, contain 6 to 20 carbon atoms, and as a further example, such groups may contain 6 to 12 carbon atoms.

The term "amino" intends an amino group —NR$_2$ where R is hydrogen or an alternative substituent, typically lower alkyl. The term "amino" is thus intended to include primary amino (i.e., NH$_2$), "alkylamino" (i.e., a secondary amino group containing a single alkyl substituent), and "dialkylamino" (i.e., tertiary amino group containing two alkyl substituents).

The term "heteroatom-containing" as in a "heteroatom-containing alkyl group" (also termed a "heteroalkyl" group) or a "heteroatom-containing aryl group" (also termed a "heteroaryl" group) refers to a molecule, linkage or substituent in which one or more carbon atoms are replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, furyl, pyrimidinyl, imidazolyl, 1,2,4-triazolyl, tetrazolyl, etc., and examples of heteroatom-containing alicyclic groups are pyrrolidino, morpholino, piperazino, piperidino, tetrahydrofuranyl, etc.

"Hydrocarbyl" refers to univalent hydrocarbyl radicals containing 1 to about 30 carbon atoms, including 1 to about 26 carbon atoms, further including 1 to about 18 carbon atoms, and further including about 1 to 12 carbon atoms, including linear, branched, cyclic, saturated and unsaturated species, such as alkyl groups, alkenyl groups, aryl groups, and the like. "Substituted hydrocarbyl" refers to hydrocarbyl substituted with one or more substituent groups, and the term "heteroatom-containing hydrocarbyl" refers to hydrocarbyl in which at least one carbon atom is replaced with a heteroatom. Unless otherwise indicated, the term "hydrocarbyl" is to be interpreted as including substituted and/or heteroatom-containing hydrocarbyl moieties.

"Halo" or "halogen" refers to fluoro, chloro, bromo or iodo, and usually relates to halo substitution for a hydrogen atom in an organic compound. Of the halos, chloro and fluoro are generally preferred.

The term "halocarbyl" refers to hydrocarbyl groups (as defined above) for which all hydrogen radicals are replaced with halo radicals. Thus the term includes perfluorinated hydrocarbyl groups, perchlorinated hydrocarbyl groups, perbrominated hydrocarbyl groups, and periodinated hydrocarbyl groups.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{20}$ aryloxy, acyl (including $C_2$-$C_{24}$ alkylcarbonyl (—CO-alkyl) and $C_6$-$C_{20}$ arylcarbonyl (—CO-aryl)), acyloxy (—O-acyl), $C_2$-$C_{24}$ alkoxycarbonyl (—(CO)—O-alkyl), $C_6$-$C_{20}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{20}$ arylcarbonato (—O—(CO)—O-aryl), carboxy (—COOH), carboxylato (—COO—), carbamoyl (—(CO)—NH$_2$), mono-substituted $C_1$-$C_{24}$ alkylcarbamoyl (—(CO)—NH($C_1$-$C_{24}$ alkyl)), di-substituted alkylcarbamoyl (—(CO)—N($C_1$-$C_{24}$ alkyl)$_2$), mono-substituted arylcarbamoyl (—(CO)—NH-aryl), thiocarbamoyl (—(CS)—NH$_2$), carbamido (—NH—(CO)—NH$_2$), cyano (—C≡N), isocyano (—N+≡C—), cyanato (—O—C≡N), isocyanato (—O—N≡C—), isothiocyanato (—S—C≡N), azido (—N=N+=N—), formyl (—(CO)—H), thioformyl (—(CS)—H), amino (—NH$_2$), mono- and di-(C$_1$-C$_{24}$ alkyl)-substituted amino, mono- and di-(C$_5$-C$_{20}$ aryl)-substituted amino, C$_2$-C$_{24}$ alkylamido (—NH—(CO)-alkyl), C$_5$-C$_{20}$ arylamido (—NH—(CO)-aryl), imino (—CR=NH where R=hydrogen, C$_1$-C$_{24}$ alkyl, C$_5$-C$_{20}$ aryl, C$_6$-C$_{20}$ alkaryl, C$_6$-C$_{20}$ aralkyl, etc.), alkylimino (—CR=N(alkyl), where R=hydrogen, alkyl, aryl, alkaryl, etc.), arylimino (—CR=N(aryl), where R=hydrogen, alkyl, aryl, alkaryl, etc.), nitro (—NO$_2$), nitroso (—NO), sulfo (—SO$_2$—OH), sulfonato (—SO$_2$—O—), C$_1$-C$_{24}$ alkylsulfanyl (—S-alkyl; also termed "alkylthio"), arylsulfanyl (—S-aryl; also termed "arylthio"), C$_1$-C$_{24}$ alkylsulfinyl (—(SO)-alkyl), C$_5$-C$_{20}$ arylsulfinyl (—(SO)-aryl), C$_1$-C$_{24}$ alkylsulfonyl (—SO$_2$-alkyl), C$_5$-C$_{20}$ arylsulfonyl (—SO$_2$-aryl), phosphono (—P(O)(OH)$_2$), phosphonato (—P(O)(O—)$_2$), phosphinato (—P(O)(O—)), phospho (—PO$_2$), and phosphino (—PH$_2$), mono- and di-(C$_1$-C$_{24}$ alkyl)-substituted phosphino, mono- and di-(C$_5$-C$_{20}$ aryl)-substituted phosphino; and the hydrocarbyl moieties C$_1$-C$_{24}$ alkyl (including C$_1$-C$_{18}$ alkyl, further including C$_1$-C$_{12}$ alkyl, and further including C$_1$-C$_6$ alkyl), C$_2$-C$_{24}$ alkenyl (including C$_2$-C$_{18}$ alkenyl, further including C$_2$-C$_{12}$ alkenyl, and further including C$_2$-C$_6$ alkenyl), C$_2$-C$_{24}$ alkynyl (including C$_2$-C$_{18}$ alkynyl, further including C$_2$-C$_{12}$ alkynyl, and further including C$_2$-C$_6$ alkynyl), C$_5$-C$_{30}$ aryl (including C$_5$-C$_{20}$ aryl, and further including C$_5$-C$_{12}$ aryl), and C$_6$-C$_{30}$ aralkyl (including C$_6$-C$_{20}$ aralkyl, and further including C$_6$-C$_{12}$ aralkyl). In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

When the term "substituted" appears prior to a list of possible substituted groups, it is intended that the term apply to every member of that group. For example, the phrase "substituted alkyl and aryl" is to be interpreted as "substituted alkyl and substituted aryl."

Unless otherwise specified, reference to an atom is meant to include isotopes of that atom. For example, reference to H is meant to include 1H, 2H (i.e., D) and 3H (i.e., T), and reference to C is meant to include $^{12}$C and all isotopes of carbon (such as $^{13}$C).

"Siloxanes" as used herein are compounds, which contain one or more silicon-oxygen bonds and may or may not contain cyclic units. The terms "polysiloxane" and "siloxane polymer" as used herein are intended to include oligomeric and polymeric siloxanes, i.e., compounds, which include two or more monomeric siloxane units.

"Silyl," unless otherwise specified, includes siloxyl, siloxazyl, and silazyl, and furthermore includes repeating silyl units, or "polysilyl" species.

The term "Polymer" as used herein intends a compound with repeating or repeatable chemical structural units (monomeric units), and the term is meant to include oligomers, which are defined as short polymers. Polymers are also referred to as resins, especially in cases where the polymeric structure is highly branched in an irregular manner and multiple monomeric units are present.

The term "organometallic" as in "organometallic compound" refers to compounds containing one or more metal atoms and one or more carbon atoms. The one or more carbon atoms are typically, although not necessarily, in the form of hydrocarbyl or halocarbyl ligands.

Polymers and Formulations

The polymers used in the preparation of the presently disclosed and claimed coatings are silicon-containing polymers which are preferably formed by a dehydrocoupling reaction, e.g., as described in commonly assigned U.S. Pat. No. 5,246,738 to Blum, issued Sep. 21, 1993 ("Hydridosiloxanes as Precursors to Ceramic Products"), the disclosure of which is hereby incorporated by reference.

Particularly preferred polymers for use in conjunction with the present invention are those which, along with methods for their preparation, are described in detail in applicants' commonly assigned U.S. patents as follows: U.S. Pat. Nos. 5,128,494 to Blum, issued Jul. 7, 1992 ("Hydridosiloxanes as Precursors to Ceramic Products"), 5,639,844 to Blum et al., issued Jun. 17, 1997 ("Dehydrocoupling Treatment and Hydrosilylation of Silicon-Containing Polymers, and Compounds and Articles Produced Thereby"), and 5,919,572 to Blum et al., issued Jul. 6, 1999 ("Temperature-Resistant and/or nonwetting coating of cured, silicon-containing polymers"). The disclosures of each of these patents are hereby incorporated by reference in their entireties, and reference may be had to these documents for information not explicitly set forth herein.

Also, particularly preferred polymers for use in conjunction with the present invention are siloxane containing polymers that possess significant level of Si—OH groups, yet the polymers are stabilized in a soluble form for periods ranging from days to months, but can be easily cured thermally or catalytically after solvent removal and/or incorporation of an appropriate curing catalyst.

In one embodiment, the disclosure provides a soluble, substantially stable and non-gelled, curable silicon-containing polymer. The polymer comprises repeat units selected from structural formulae (III)-(VI)

$$[R^1Si(OH)O]_k \qquad (III)$$

$$[R^1Si(OR^{10})O]_m \qquad (IV)$$

$$[R^1SiO_{1.5}]_n \qquad (V)$$

$$[R^1Si(H)O]_p \qquad (VI)$$

$$[R^2R^3SiO]_q \qquad (VII)$$

In formulae (III)-(VI), $R^1$ is C$_1$-C$_{30}$ hydrocarbyl. For example, $R^1$ is selected from C$_1$-C$_{30}$ alkyl, C$_5$-C$_{30}$ aryl, C$_6$-C$_{30}$ aralkyl, and C$_6$-C$_{30}$ alkaryl, any of which may be substituted or unsubstituted and optionally heteroatom containing. For example, $R^1$ may be C$_1$-C$_{30}$ alkyl, substituted C$_1$-C$_{30}$ alkyl, heteroatom-containing C$_1$-C$_{30}$ alkyl, substituted heteroatom-containing C$_1$-C$_{30}$ alkyl, C$_2$-C$_{30}$ alkenyl, substituted C$_2$-C$_{30}$ alkenyl, heteroatom-containing C$_2$-C$_{30}$ alkenyl, substituted heteroatom-containing C$_2$-C$_{30}$ alkenyl, C$_2$-C$_{30}$ alkynyl, substituted C$_2$-C$_{30}$ alkynyl, heteroatom-containing C$_2$-C$_{30}$ alkynyl, substituted heteroatom-containing C$_2$-C$_{30}$ alkynyl, C$_5$-C$_{30}$ aryl, substituted C$_5$-C$_{30}$ aryl, heteroatom-containing C$_5$-C$_{30}$ aryl, substituted heteroatom-containing C$_5$-C$_{30}$ aryl, C$_6$-C$_{30}$ alkaryl, substituted C$_6$-C$_{30}$ alkaryl, heteroatom-containing C$_6$-C$_{30}$ alkaryl, substituted heteroatom-containing C$_6$-C$_{30}$ alkaryl, C$_6$-C$_{30}$ aralkyl, substituted C$_6$-C$_{30}$ aralkyl, heteroatom-containing C$_6$-C$_{30}$ aralkyl, and substituted heteroatom-containing C$_6$-C$_{30}$ aralkyl.

In formula (VII), $R^2$ and $R^3$ are independently selected from H, C$_1$-C$_{30}$ hydrocarbyl, organometallic, halocarbyl, and organosilyl, each of which is optionally substituted and is optionally heteroatom-containing.

For example, $R^2$ and/or $R^3$ are selected from H and C$_1$-C$_{30}$ hydrocarbyl (as enumerated for $R^1$)

As a further example, $R^2$ and/or $R^3$ is/are $C_1$-$C_{30}$ halocarbyl. Such groups include substituted and unsubstituted $C_1$-$C_{30}$ haloalkyl, substituted and unsubstituted $C_1$-$C_{30}$ heteroatom-containing haloalkyl, substituted and unsubstituted $C_1$-$C_{30}$ haloalkenyl, substituted and unsubstituted $C_1$-$C_{30}$ heteroatom-containing haloalkenyl, substituted and unsubstituted $C_1$-$C_{30}$ haloalkynyl, and substituted and unsubstituted $C_5$-$C_{30}$ haloaryl.

As a further example, $R^2$ and/or $R^3$ is/are $C_1$-$C_{30}$ organosilyl. Such groups include substituted and unsubstituted $C_1$-$C_{30}$ alkylsilyl, substituted and unsubstituted $C_2$-$C_{30}$ alkenylsilyl, substituted and unsubstituted $C_2$-$C_{30}$ alkynylsilyl, substituted and unsubstituted $C_5$-$C_{30}$ arylsilyl, substituted and unsubstituted heteroatom-containing $C_5$-$C_{30}$ arylsilyl, substituted and unsubstituted $C_6$-$C_{30}$ alkarylsilyl, and substituted and unsubstituted $C_6$-$C_{30}$ aralkylsilyl. Particularly preferred are groups having the formula —$SiQ_3$, wherein each Q is independently selected from —$R^a$ and —$OR^a$, wherein $R^a$ is lower alkyl (e.g., methyl, ethyl, propyl, butyl, etc.) or aryl (e.g., phenyl, etc.).

As a further example, $R^2$ and/or $R^3$ is/are $C_1$-$C_{30}$ organometallic. Such groups include groups having one or two metal atoms, such as alkali and alkali earth metals (e.g., Li, Na, K, Be, Mg, and Ca), B, Ga, Ge, transition metals (e.g., Ti, V, Cr, Mn, Fe, Co, Ni, Cu, Zn, Mo, Ru, Rh, Pd, Ag, Cd, W, Re, Os, Ir, Pt, Au, and Hg), lanthanides and actinides. The metal atom(s) is/are bonded to one or more (particularly 2, 3, 4, or 5) ligand groups selected from $C_1$-$C_{30}$ alkyl, $C_2$-$C_{30}$ alkenyl, $C_2$-$C_{30}$ alkynyl, $C_5$-$C_{30}$ aryl, $C_6$-$C_{30}$ aralkyl, and $C_6$-$C_{30}$ alkaryl groups, any of which may be substituted or unsubstituted and may be heteroatom-containing). For example, ligand groups for $C_1$-$C_{30}$ organometallic groups include $C_1$-$C_{30}$ alkoxy, $C_5$-$C_{30}$ aryloxy, $C_6$-$C_{30}$ aralkyloxy, $C_6$-$C_{30}$ alkaryloxy. Particularly preferred examples of ligand groups for $C_1$-$C_{30}$ organometallic groups includes lower alkyl such as methyl, ethyl, propyl, and butyl, lower alkoxy such as methoxy, ethoxy, and butoxy, aryl such as phenyl and pentyl, aryloxy such as phenyloxy, and alkynyl such as —C≡C-Ph. Other preferred ligand groups include carbonyl, cyano, and cyclopentadienyl. In some embodiments, the organometallic groups have the structure -$ML_n$, —$OML_n$, or —$NR^bML_n$, wherein M is the metal atom, each L is a ligand group independently selected from the ligand groups previously mentioned, $R^b$ is lower alkyl, and n is an integer that varies according to the valency of M. It will be appreciated that ligand groups also include halo groups, and that therefore the organometallic groups include organohalo groups.

In formula (IV), $R^{10}$ is selected from $C_1$-$C_{30}$ hydrocarbyl (as enumerated for $R^1$), $C_1$-$C_{30}$ halocarbyl (as enumerated for $R^2$ and $R^3$), organometallic (as enumerated for $R^2$ and $R^3$), and organosilyl (as enumerated for $R^2$ and $R^3$). In some preferred embodiments, $R^{10}$ is a biocidal moiety, an optically response moiety, or an electrically responsive moiety.

It will be appreciated that formula (V) represents a "crosslinking unit," in which the Si atom bonds to three —O—Si— units or is part of a silsesquioxane cage or linked ring, which does not provide crosslinking characteristics.

The variables k, m, n, p and q represent the fraction of repeat units of the silicon-containing polymer that have the structural formula (III), (IV), (V), (VI), and (VII) respectively. The polymer may have any combination of the repeat units according to formulae (III)-(VII), provided that the polymer remains soluble, substantially stable, non-gelled, and curable.

For example, n has a value between 0 and about 0.5. For example, n is less than about 0.5, or less than about 0.4, or less than about 0.3, or less than about 0.2, or less than about 0.1.

Also for example, q has a value between 0 and about 0.8; For example, q is less than about 0.8, or less than about 0.7, or less than about 0.6, or less than about 0.5, or less than about 0.4, or less than about 0.3, or less than about 0.2, or less than about 0.1, or less than about 0.05.

Also for example, m has a value between 0 and about 0.5. For example, m is less than about 0.5, or less than about 0.4, or less than about 0.3, or less than about 0.2, or less than about 0.1, or less than about 0.05.

Also for example, k has a value between 0.05 and 0.95. In some embodiments, k has a value between about 0.3 and 0.95. For example, k is less than about 0.9, or less than about 0.8, or less than about 0.7, or less than about 0.6, or less than about 0.5, or less than about 0.4, or less than about 0.3, or less than about 0.2, or less than about 0.1. In some embodiments, k is more than about 0.5, or more than about 0.6, or more than about 0.7, or more than about 0.8, or more than about 0.9.

Also for example, p has a value that is less than 1.0, or less than 0.95, or less than 0.8. For example, p may be less than 0.7, or less than 0.6, or less than 0.5, or less than 0.4, or less than 0.3, or less than 0.2, or less than 0.1, or less than about 0.05. In some embodiments, where the polymer is present in a formulation that further comprises an active dehydrocoupling catalyst and curing agent, p has a value that is less than about 0.1.

In some embodiments, the value of k is more than the value of n or the value of m. In some embodiments, the values of k, m, n, q, and p are such that the polymer materials of the disclosure maintain substantial stability in solutions, between days to months, before solvent is removed and/or catalyst is introduced and the polymer is then efficiently cured by thermal and/or catalytic processing (optionally in the presence of an additional crosslinking agent).

In a preferred embodiment the presence of formula (III) is of particular importance to provide (a) good wettability of substrate, (b) chemical bonding to substrates via Si—O-Surface bonding and (c) self curing by thermal and/or catalytic reaction by condensing Si—OH to Si—O—Si bonds. At the same time the polymer consisting of formula (III) units or a combination of Formula (III) and (VI) should be stabilized in its processing formulation long enough to provide at least convenient time for coating deposition or preferably prolonged period for shipping and storing purposes.

In some embodiments, the soluble, substantially stable and non-gelled, curable silicon-containing polymers have a unit having the structure of formula (IIa) as a terminal site unit:

(IIa)

wherein $R^4$ is as defined for $R^2$ and $R^3$. It will be appreciated, however, that other terminal units (e.g., —$OR^4$, —H, —CH=$CH_2$, etc.) are within the scope of the disclosure.

The soluble, substantially stable and non-gelled, curable silicon-containing polymers of the disclosure are easily prepared by a reaction or a series of reactions involving a precursor polymer comprising units having the structural formula (I)

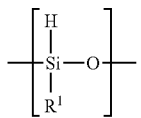

(I)

wherein $R^1$ is as defined previously. For example, $R^1$ may be selected from H, $C_1$-$C_{30}$ alkyl, $C_5$-$C_{30}$ aryl, $C_6$-$C_{30}$ aralkyl, and $C_6$-$C_{30}$ alkaryl, each of which is optionally substituted and is optionally heteroatom containing. The precursor polymer optionally further comprises units having the structure of formula (II)

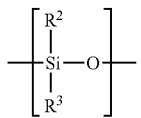

(II)

wherein $R^2$ and $R^3$ are as defined previously. For example, each $R^2$ and $R^3$ is independently selected from H, $C_1$-$C_{30}$ alkyl, $C_5$-$C_{30}$ aryl, $C_6$-$C_{30}$ aralkyl, and $C_6$-$C_{30}$ alkaryl, each of which is optionally substituted and is optionally heteroatom containing.

The reactions involving the precursor polymer further comprises a second reagent selected from $H_2O$, an alcohol having the structure $R^{10}OH$, a mixture of alcohols each having the structure $R^{10}OH$, and combinations thereof, wherein $R^{10}$ is as defined previously. For example, each $R^{10}$ is independently selected from hydrocarbyl, halocarbyl, organometallic, and organosilyl, each of which is optionally substituted and is optionally heteroatom containing.

The term "dehydrocoupling" as used herein refers to a reaction between —Si—H and H—O— groups existing on separate or the same compound or polymer to form —Si—O— functional group and release $H_2$. It is also referred to as "dehydrogenative coupling." Such dehydrocoupling reactions are also referred in the literature to as "hydrolysis" and "hydrolytic oxidation" if the reaction occurs with water, or "alcoholysis" if the reaction occurs with alcohols, but these are not the most appropriate definitions.

The reactions involving the precursor polymer is a dehydrocoupling reaction carried out in the presence of a dehydrocoupling catalyst. For example, the dehydrocoupling catalyst is effective to convert at least about 90% of the Si—H groups in the precursor polymer to Si—O— groups, provided that no more than 50% of the uncured silicon-containing polymer product units have the structure [$Si(R^1)O_{1.5}$] [i.e., formula (VII)].

In some embodiments, the polymers of the disclosure are prepared in a method that further comprises reacting, in a hydrosilylation reaction, the precursor polymer with one or more alkenyl-containing reagents and/or one or more carbonyl containing reagents in the presence of a hydrosilylation catalyst. The term "hydrosilylation" as used herein refers to the reaction between compounds containing —Si—H groups and compounds containing unsaturated alkene (C=C) or carbonyl (C=O) groups to form an addition product possessing, respectively, —Si—C—CH— and —Si—O—CH— groups. The hydrosilylation reaction may be carried out before, during or after the dehydrocoupling reaction. The hydrosilylation reaction may convert between 1% and 50% of the Si—H groups to Si—(CHR"—$CH_2$)R'", Si—(CHR"—$CH_3$), Si—($CH_2$—$CH_2$)R'" or Si—OCHR"R'" groups, wherein R" and R'" are the same or different and selected from hydrogen, hydrocarbyl, substituted hydrocarbyl, heteroatom containing hydrocarbyl, and substituted heteroatom containing hydrocarbyl, provided that R" and R'" cannot both be hydrogen. Furthermore, all or a portion of the hydrosilylation catalyst may also function as the dehydrocoupling catalyst. Alternatively, a separate dehydrocoupling catalyst may be used. Preferred hydrosilylation catalysts include catalysts of Pt, Rh, or Ru. In some embodiments, the Further details of catalysts, the hydrosilylation reaction, and the dehydrocoupling reaction are provided herein below.

In some embodiments, the reaction is carried out in a solvent that is also the dehydrocoupling or the hydrosilylation reagent or a mixture of reagents. In some embodiments, the reaction involving the precursor polymer is carried out in an inert solvent. In some preferred embodiments, the solvent is capable of preventing or significantly slowing the condensation of Si—OH groups to Si—O—Si (i.e., crosslinking) groups.

Some exemplary methods for preparing the polymers of the disclosure using polyhydridomethylsiloxane (PHMS) as the starting material are shown in FIG. 1. It will be appreciated that the polymers shown in FIG. 1 are not meant to be limiting. For example, each of the polymers may have additional repeat units that are not shown in the FIGURE, but are consistent with the disclosure. The polymers may also be a combination of several of the structures shown in FIG. 1.

In FIG. 1, reactions involving olefin reactants are hydrosilylation reactions, whereas reactions involving $R^{10}OH$ and/or water are dehydrocoupling reactions. The reactants used in the reactions shown in FIG. 1 are as follows: (a) $H_2O$, catalyst; (b) $H_2O$ (excess), catalyst; (c) $R^{10}$—OH, catalyst; (d) $R^{10}$—OH (excess), catalyst; (e) $H_2O$, $R^{10}$—OH, catalyst; (f) R"—CH=$CH_2$, $H_2O$, catalyst; (g) $R^{10}$—OH, R"—CH=$CH_2$, catalyst; and (h) R"—CH=$CH_2$, $R^{10}$—OH, $H_2O$), catalyst. In FIG. 1, $R^{10}$ is as defined previously, and R" is as defined for $R^2$ and $R^3$. In some embodiments, for example, $R^{10}$ is selected from: hydrogen and substituted or unsubstituted $C_1$-$C_{20}$ alkyl, $C_1$-$C_{20}$ alkenyl, and $C_5$-$C_{30}$ aryl. Also in FIG. 1, In some preferred embodiments, R" is selected from H, $C_1$-$C_{30}$ hydrocarbyl, organometallic, halocarbyl, and organosilyl. It is within the scope of the disclosure to have more than one type of $R^{10}OH$ and/or $R^{10}$—CH=$CH_2$ reactants participating in the synthesis of the polymer. In such mixed substitution reactions, typically the R"—CH=$CH_2$ is reacted first, then $R^{10}$—OH, and finally $H_2O$. The $R^{10}$—OH and the $H_2O$ may also be reacted simultaneously. In some embodiments, the $R^{10}OH$ and R"—CH=$CH_2$ are on the same compound, such as in allyl alcohol ($CH_2$=CH—$CH_2$—OH). The catalyst used for reacting each of the reactants may be the same or different and may be added at the same time or in a sequence.

In some embodiments, the combined molar amount of $H_2O$ and/or $R^{10}OH$ present in the reaction is greater than the molar amount of the Si—H groups on the polymer. In some embodiments, the molar amount of the $H_2O$ present in the reaction is greater than the molar amount of the Si—H groups on the polymer. When more than one second agent is used, such as water and an alcohol, or a plurality of alcohols, such reagents may be added in sequence or in combination. For example, one or more alcohols is combined with the precursor polymer and allowed to react for a predetermined period of time before $H_2O$ is added to the reaction. In some embodiments, the molar amount of $H_2O$ is greater at least 2 times over the molar amount of Si—H groups. When both water and alcohol are present, and a dehydrocoupling catalyst such as $Ru_3(CO)_{12}$ is used, the reaction with water will generally take place first due to much faster kinetics.

In some embodiments, the dehydrocoupling reaction is performed solely or predominantly with water and leads to the conversion of less than 90% of the Si—H groups. In such embodiments, the dehydrocoupling catalysis reaction is quenched by removing the catalyst or deactivating it via strong complexation of the catalyst, added inhibitor or pH adjustments to prevent crosslinking by the internal dehydrocoupling of Si—H and HO—Si functional groups.

Suitable catalysts for the reactions described herein (e.g., the reactions shown in FIG. 1) involve compounds capable of catalyzing either or both hydrosilylation and/or dehydrocoupling. In some embodiments, a single catalyst is used to catalyze both reactions, either simultaneously or in sequence such as vinyl platinum catalysts. In other embodiments, a mixture of catalysts is used to catalyze the hydrosilylation and/or dehydrocoupling reactions, again simultaneously or in a sequence. Catalysts include metal-based catalysts, particularly transition metal-based catalysts, with ruthenium, rhodium, nickel, palladium, iridium, cobalt, chromium, tungsten, molybdenum, iron, and platinum and rhenium catalysts being preferred. Most preferred catalysts are based on Pt, Ru, Pd and Rh. The catalysts may be either homogeneous or heterogeneous. (It should be pointed out here that the "homogeneous" and "heterogeneous" classifications are made herein on the basis of solubility in organic solvents. However, it is not uncommon that during the reactions, homogeneous catalysts may be converted into heterogeneous form and vice versa.) Heterogeneous catalysts are also inorganic metals or metal compounds in the form of nanoparticles or deposited on a high surface area carrier. The catalysts may include any number of ligands, including amino, silyl, halogen, carbonyl, hydrido, phosphine, and organic ligands, as illustrated in the examples below. Examples of potential homogeneous catalysts include $H_4Ru_4(CO)_{12}$, $Ru_3(CO)_{12}$, $Ru(CO)_4(SiR_3)_2$, $Ru(CO)_4$, $(H)(SiR_3)$, (acenaphthylene)$Ru_3(CO)_7$, (acenaphthylene)$Ru_3(H)(SiR_3)(CO)_6$, $Fe_3(CO)_{12}$, $Rh_6(CO)_{16}$, $Rh_4(CO)_{12}$, $Co_2(CO)_8$, $(Ph_3P)_2Rh(CO)H$, $RhCl_3$, $[RhCl(CO)_2]_2$, $H_2PtCl_6$, Pt-vinylsiloxane (Karsted's catalyst), nickel cyclooctadiene, $Os_3(CO)_{12}$, $H_2Os_3(CO)_{10}$, $Ir_4(CO)_{12}$, $(Ph_3P)_2Ir(CO)H$, $IrCl(C_8H_{12})_2$, $Pd(OAc)_2$, $PdCl_2$, $Cp_2TiCl_2$, $(Ph_3P)_3RhCl$, $Pd(Ph_3P)_4$, $(arene)Cr(CO)_2(H)(SiHPh_2)$, $RuCl_3$, $RuCl_2(PPh_3)_3$, $Ru(CO)ClH(PPh_3)_3$, $Ru(CO)_2H_2(PPh_3)_3Ru(cod)Cl_2$, $RuH_2(PPh_3)_4$, $[RuCl_2(benzene)]_2$, $[RuCl_2(p-cymene)]_2$, $Re(O)(oxazoline)_2Cl$, $Cp_2TiCl_2$, $[Ph_3PCuH]_6$, $Fe(CO)_5$, $Fe_2(CO)_8$, $Fe_3(CO)_{12}/Ru_3(CO)_{12}$, $Os_3(CO)_{12}$, or similar compounds. Examples of potential heterogeneous catalysts include Pt/C, Pt/BaSO$_4$, Cr, Pd/C, Ru/C, Co/C, Pt black, Co black, Pd black, Ir/Al$_2$O$_3$, Pt/SiO$_2$, Rh/C, Rh/TiO$_2$, Rh/La$_3$O$_3$, Pd/Ag alloy, LaNi$_5$, PtO$_2$, Raney nickel, and Ag.

In preferred embodiments, the dehydrocoupling catalyst is effective to convert at least 20 mol % of Si—H groups on the precursor polymer to Si—O groups. In particularly preferred embodiments, the catalyst is effective to convert at least about 90 mol % of the Si—H groups. For example, the catalyst may be effective to convert at least about 30 mol %, or at least about 40 mol %, or at least about 50 mol %, or at least about 60 mol %, or at least about 70 mol %, or at least about 80 mol % of the Si—H groups to Si—O groups.

Acidic and basic catalysts may also be used for the dehydrocoupling reaction, although they are not as efficient as some of the transition metal catalysts disclosed herein. Typically, for reactions with R—X—H where X is O, suitable catalysts include acid catalysts such as HCl, $H_2SO_4$, HBr, $NH_4C_1$, $NH_4Br$, $AlCl_3$, $BCl_3$, sulfonic acid, $H_3PO_4$ and Phosphonic acid; and basic catalysts such as NaOH, KOH, Ca(OH)$_2$, NH$_3$, amines, polyamines, aminosilanes such as $[H_2N(CH_2)_3SiCH_3O]_{4-5}$ or $H_2N(CH_2)_3Si(OCH_2CH_3)_3$ and aromatic amines, such as pyridine.

The catalyst(s) may be supported on a substrate comprising a polymeric material, an inorganic salt, carbon, a ceramic material or the like. The heterogeneous catalyst may be provided in a designed shape, such as particles, porous plates, etc. The catalyst can be activated by heating alone or by concurrent treatment of the reaction medium with particulate or nonparticulate radiation. The catalyst may also be activated or inhibited by additives such as acids, bases, oxidants or hydrogen, or may be stabilized by reagents such as amines, phosphines, arsines and carbonyl. Catalyst concentration may be within the range of about 0.1 ppm or less to about 1000 ppm or more. The concentration of catalyst may also be measure with respect to the amount of reactants, and will usually be less than or equal to about 1 mole % based on the total number of moles or reactants, usually between about 0.1 and 500 ppm.

It will be appreciated that the reactions described herein, such as those shown in FIG. 1, are not limited to using polyhydromethylsiloxane (PHMS) as the starting material. In particular, the polymers of the disclosure may be prepared from the reaction of: (i) a polymer that contain monomeric units of formula (I)

(I)

in which n represents 5 mol % or more of the total monomeric units present in the polymer, and in which $R^1$ is as defined previously; (ii) $H_2O$, $R^{10}OH$, or a combination thereof, wherein $R^{10}$ is as defined previously; and optionally (iii) a terminal olefin-containing compound, in the presence of a catalyst or a mixture of catalysts effective to convert at least about 90% of the Si—H bonds to Si—OH, Si—OR$^{10}$, and/or Si—R", wherein R" is derived from the terminal olefinic-containing compound.

The polymers of the disclosure may be prepared using cyclomer-containing hydridosiloxane as a starting material. For example, such compounds may have the structural formula

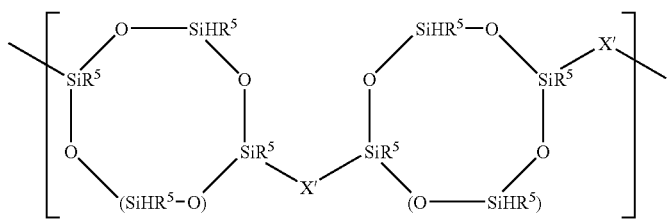

wherein each $R^5$ substituent is independently selected from the group consisting of hydrogen, hydroxyl, lower alkyl, lower alkenyl, lower alkoxy, silyl, aryl, and amino, unsubstituted or substituted with 1 or 2 lower alkyl groups; and X' is O or O—Y—O, wherein Y is a bulky organic group or silyl.

Furthermore, the polymers of the disclosure may be prepared from copolymer starting material. Such copolymer may, for example, have the structure of formula (Ia)

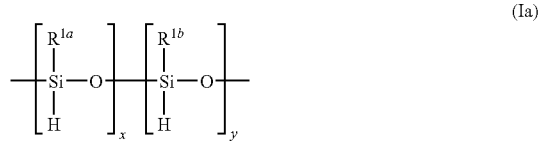

(Ia)

wherein $R^{1a}$ and $R^{1b}$ are different and independently selected and are as described for $R^1$. The subscript "x" and "y" are fractional numbers greater than 0, with the proviso that the sum of x and y is 1. It will be appreciated that any of the copolymers described herein, including those with structures that are encompassed by formula (II), are not meant to be limited with respect to architecture. Thus, copolymers may have any appropriate arrangement of repeat units including random, alternating, block, graft, and the like.

Referring again to reaction (b) in FIG. 1, reacting PHMS with an excess of water under catalytic conditions provides at least 90%, and preferably at least 95% conversion of the Si—H groups to Si—OH groups. The resulting hydroxyl-modified polyhydridomethylsiloxane (referred to herein as PHMS-OH) comprises high levels of $[CH_3Si(OH)O]$ monomeric units, lower level of $[CH_3SiO_{1.5}]$ crosslinking units, and minimal $[CH_3Si(H)O]$ monomeric units (not shown). The amount of crosslinking units is such that the polymer is still a liquid and can be long term stabilized in solutions and slurries containing particles and solvents. This product may be a liquid polymer with low to medium viscosity (for example, below about 100 to 1000 cps) and a branched polymer with more than 50 mol % $[CH_3Si(OH)O]$ monomeric units in its structure. This polymer is polar and wets surfaces of metal, glass, ceramic and plastic materials. PHMS-OH may be self-cured via a condensation reaction that can be enhanced thermally or in the presence of a condensation catalyst (such as a base or an acid). In contrast to PHMS, PHMS-OH is hydrophilic and is soluble in, for example, mixtures of alcohols (such as ethanol) with water, which allows (for example) the formation of low VOC content paints.

Polymer Formulations and Method of Making a Coating

The polymers described herein may be present in a polymer formulation. Polymer formulations may include one or more additional components such as solvents, fillers, and other additives such as those described in more detail below.

The polymers of the disclosure are suitable for forming coatings, foams, and composite matrices. Methods for preparing such coatings typically involve preparing a polymer formulation.

Coated substrates according to the invention are prepared in some embodiments by dissolving the selected polymer or polymers in a compatible organic solvent, if necessary, to prepare a coating solution. It should be noted that some polymers, which exist as low viscosity liquids may be used to prepare coatings without need for a solvent. However, in most cases, a solvent is required to adjust the paintability parameters and control the thickness of the coatings. Alcohols, ketones, esters and ethers such as THF are typical solvents. Polar solvents that are water compatible also allow maintenance of the water fraction in the overall formulation. For example, alcohols and diols with 1 to 5 carbons may be used. In some embodiments, the solvent is selected from the regulatory exempted VOC list. In many cases, part or all of the used solvent is the alcohol used for the synthesis of the modified polymer, hence, there is no need to remove the solvent after the reaction is completed. In some cases, the solvent may serve as crosslinker or, in contrast, as a stabilizer, to prevent polymer self-crosslinking during long shelving periods.

Preferred solvents for preparing the coating solution are such that they do not react with the polymer in an undesired fashion and are sufficiently volatile to facilitate drying of the coating. Also, when possible, it is desirable to avoid use of hazardous solvents such as benzene, trichloroethylene or the like. Examples of particularly preferred solvents include toluene, tetrahydrofuran and hexane, cyclohexane, other hydrocarbon, ethers, esters, ketones or nonprotic solvents for polymers containing Si—H bonds. For polymers containing Si—OH and Si—OR bonds systems, alcohols are the preferred solvents as well as the organic solvents possessing polarity such as ethers or esters. The coating solution will generally be formulated to contain on the order of 0.1 wt. % to 99 wt. % polymer, more preferably 1 wt. % to 50 wt. % polymer, and most preferably 10 wt. % to 30 wt. % polymer.

Additional components which may be present in the coating solution include catalysts capable of activating Si—H, and/or O—H bonds leading to curing by dehydrocoupling, hydrosilylation, hydrolysis-condensation or condensation reactions, and crosslinking agents.

In some embodiments, the polymer formulations of the disclosure comprise a particulate filler. The filler is selected from powders, nanoparticles, flakes, platelets, layered materials, whiskers, fibrils and chopped fibers.

The particulate fillers may be organic or inorganic. Powders may be added for a number of reasons, one of which is to increase the viscosity of the coating solution to enable preparation of a paste or of a relatively thick solution which may be "painted" onto a substrate ("rheology modifiers"). Another major and conventional reason to add powders is to provide a color or coverage to the coatings rendering them as "paints".

Testing formulations with various inorganic fillers at various polymer to powder ratio indicates a correlation between the type of the powder and an optimal ratio and the best performing results. Hence, the formulated are to be considered as composite coatings with enhanced mechanical, thermal and chemical protection over a clear coating.

The particulate fillers may provide chemical, physical, or apparel aspects to the integrated coating. For example, metal powders, such as copper, aluminum, zinc, nickel, iron, stainless steel, cobalt, chrome, zirconium, titanium, tungsten, molybdenum and aluminum powders may be admixed with the polymeric solution prior to coating. Such a technique is useful, for example, to provide an anti-corrosion barrier on the surface of a metallic substrate, by providing a sacrificial oxidation later, a thermal expansion coefficient matching layer, an electrically or thermally conductive/capacity modifier, or a tribology modifyer. Other powder candidates are aluminide, silicide, and boride of metals such as Fe, Cr, Co, Ti, Zr, Hf, and Mo. Incorporation of metal or their aluminide, silicide, boride or sulfide composition powders into the coating solution is also useful to prepare a coating with one or more of the above desired modifications.

It may also be desired to incorporate ceramic powders and glasses such as oxides and mixed oxides, carbides, nitrides, oxycarbides, oxynitrides, carbonitrides, carbonates, borates, borides, phosphates, aluminides, aluminates, silicides, sulfides, sulfates, tungstates, titanates, zirconates, and silicates of metals, such as Si, Ti, Al, Zr, Fe, Ce, Y, La, W, Mo, Cr, Co and mixtures of such elements, such as aluminum silicate, typically for the purpose of creating a harder coating, a more thermally insulating coating, a higher dielectric coatings, and/or electrically resistance coatings and also useful for providing corrosion-resistant coatings, impact-resistant coatings, and coatings having a matched or mismatched thermal expansion coefficient, i.e., relative to the substrate surface.

Metal salts, minerals, carbon, organic and inorganic polymers, and combinations thereof may be used. In some embodiments, solid lubricant fillers are employed, such as those that are comprised of molybdenum sulfide or tungsten sulfide.

Inclusion of silica, boron nitride, aluminum nitride or beryllium oxide powders in the coating solution is desirable in electronics application, insofar as these materials are good low k materials. Carbon particulates (including pyrolytic carbon powder, graphite powder, nanotubes and microfibers) and organic powders such as TEFLON®, siloxane (cured), polyacrylate, polycarbonate, or polyamide powders may also be used to thicken the coating solution. Particulate fillers may comprises an organic or inorganic polymer selected from fluorine- or silicon-containing polymers. In some embodiments, the particulate filler is a mixture of metal and ceramic and/or carbon particulates.

In one embodiment, a filler comprising flakes is added to the coating solution prior to coating a substrate. The flakes can add protection capability, coloring effects, as well as mechanical integrity (toughness) by forming a composite structure. Preferred materials for flakes include metals such as aluminum, copper, nickel, silver, steel, zinc, and alloys thereof; minerals such as graphite, mica, and silicates (such as quartz and clay); and ceramics such as oxides, nitrides, carbides, borides, and silicides and salts like barium sulfate. Generally, the preferred flakes, platelets, or layered structures have thicknesses and/or widths within the range of about 0.05 μm to about 20 μm, or about 0.1 μm to about 10 μm, for example within the range of about 0.5 μm to about 1 μm, and having longitudinal lengths within the range of about 1 μm to about 100 μm, for example within the range of about 10 μm to about 50 μm. The flakes may be coated with a protecting, passivating or compatibilizing. The flakes may be purchased from commercial sources, or may be prepared using methods known in the art such as mechanical crushing.

The powders can be added in a form of nanoparticles. This form is particularly important where transparency or translucency of the coating is required. Nanoparticle additives can be also used as mechanical strength enhancers, rheology modifiers, tribological aids, gas barriers, corrosion inhibitors, colorants, optical and electromagnetic additives, and conductive media. The filler may impart stability toward acids and/or bases. In some embodiments, the particulate filler is effective to prevent substantially all cracking from occurring in the coating during the curing or operation at elevated temperature.

The powders can be added in a form of chopped fibers, fibrils nanofibrils, nanorods, and nanotubes that have aspect ratio greater than 10 and in the range of 10 to 1000.

Reactive filler may be used, including fillers that react with the polymer or other components of the formulation, or react under the environmental conditions of curing the coating, or melts during the processing.

More than one filler may also be used in the coatings disclosed herein. The plurality of fillers may be used in equal parts, or one filler may be used in excess. For example, metal (e.g., aluminum) flakes and a ceramic (e.g., alumina) powder is a preferred combination of filler materials for conventional corrosion resistance formulations. Such combinations of fillers may be used in any ratio, for example a ratio between about 1:5 to about 5:1 of metal to ceramic particles.

When added, the filler material will typically be present in an amount that is between about 1 vol % and about 65 vol. % of the polymer deposited coating, preferably between about 10 vol. % and about 40 vol. %. Such weight percentages are intended to refer to weight percentages as measured after evaporation of any solvents that may be used or gases evolved during curing (i.e., post-curing).

A wide variety of substrates may be coated using the present polymers and methods, including metals and their alloys, ceramics, glass and organic materials such as polycarbonate, polycarbonate alloys, polyesters, polyamides, polyimides, fluoropolymers, and acrylates. Examples of metal substrates include steels, stainless steels, aluminum, iron, copper and the like, while examples of ceramics include glasses, silicon nitride, silicon carbide, silica, alumina, zirconia, titania, fiber reinforced composites and the like. It will be appreciated by those skilled in the art that the foregoing lists are merely illustrative of various materials which may be coated using the presently disclosed techniques, and are not in any way limiting of the different substrates with which the present invention is useful.

The present method is also useful in coating substrates having different shapes, e.g., substrates having flat surfaces, molded articles having curved surfaces, fibers, porous materials and the like.

A coating may be applied by dipping the substrate to be coated in the aforementioned coating solution or slurry. Alternatively, the coating solution may be applied to the substrate by painting (e.g., brushing or rolling), spraying or spin-coating techniques. These procedures will typically provide coatings having a thickness of up to about 100 μm, up to about 50 μm per coating layer for the cured polymers, but may provide coatings on the order of 1 μm, or even thinner, if desired, mostly without added fillers or with nanosized fleers. For example, the coating may have a thickness after curing of between about 0.01 μm and about 100 μm, or between about 0.1 μm and about 20 μm. Multiple coating layers may be provided, for example if a thicker coating or a coating with particular properties is desired. The layers may be comprised of the same or different polymeric materials and/or formulations. The formulations used for two or more different coating layers may, for example, differ in one component, or multiple components. In some embodiments, a second coating layer is applied over a first coating layer, wherein the first coating layer is cured prior to deposition of the second coating layer. In other embodiments, the second coating layer is deposited prior to any curing of the first coating. In such embodiments, curing can involve simultaneous or stepwise curing of the different layers. Deposition of a second layer prior to the curing or full-curing of the first layer is desired to maximize the wetting of the deposited formulation of the second layer and/or maximizing the adhesion to the first layer. For example, the use of two polymers with different curing temperatures allows stepwise curing. Simultaneous curing of multiple layers may, for example, prevent cracks from forming in the coating layers upon curing.

In some embodiments, the coatings of the disclosure (after curing) provide corrosion and/or chemical resistance and/or thermal stability for the substrate. In some embodiments, the coated substrate after curing is more corrosion and/or chemical resistant and/or thermally stable than the substrate without the coating. In some embodiments, the coated substrate after curing is more scratch resistant and has a lower surface tension than the substrate without the coating. In some embodiments, the coating after curing provides good tribological characteristics for sliding motion associated with the coated surface, or for sliding surfaces in the presence of oil or water.

In embodiments having more than one coating layer, the formulations of the coating layers may differ from each other by at least one different component.

Such methods may also involve a plurality of coating layers wherein the formulations of the coating layers are the same. Curing may be done after each coating, or after all of the coating layers have been deposited.

In a further embodiment, the disclosure provides a method for coating a substrate surface, the method comprising: (a) applying to the substrate the polymer solution or slurry; and (b) drying and curing the coating formulation applied in (a) at a temperature T for a predetermined period of time and optionally in the presence of a curing catalyst, wherein T is below the temperature required for pyrolysis of the silicon-containing polymer.

Curing

After preparing the coating formulation, and depositing the coating formulation on a suitable substrate, the coating is cured by an appropriate curing method.

Depending on the polymer, curing agents and/or curing catalysts used, the coating is cured at a curing temperature T, wherein T is below the temperature required for pyrolysis of the silicon-containing polymer used in the coating. Preferably, T ranges from room temperature to about 300° C., more preferably from room temperature to about 200° C. In some embodiments, T is about 100° C. or less, or about 150° C. or less. It is typically preferred that the curing temperature not exceed about 350° C., particularly for preparation of nonwetting coatings. In preferred embodiments, T is below the temperature required for pyrolysis of the silicon-containing polymer. In some embodiments, the curing temperature is above the temperature required to cause curing by condensation of Si—OH groups and/or hydrolysis-condensation of Si—OR groups of the curable silicon-containing polymer in the absence of a catalyst. The curing process is carried out for a length of time sufficient to allow for the desired degree of cross-linking within the coating. Such length of time may be as little as 1 minute or less, or as much as up to about 1 week or up to about 1 month at ambient temperature. Some preferred times are between about 1 minute and about 3 days or about 1 hour to about 3 hours. Curing at elevated temperature (such as 150 to 200° C. or up to 350° C.) is carried out in the time range of 1 min to 24 hours, or about 10 min to 10 h.

The curing process may also be carried out by briefly and repeatedly exposing the coatings to elevated temperatures to avoid damage to sensitive substrate, for example repeated exposure times of between about 5 seconds and about 1 minute for coatings on low melting point plastics. Such rapid heating and cooling cycles can be accomplished by IR heaters, microwave, and other surface radiation techniques. Thus, the curing step may involve rapid heating or irradiation of the deposited coatings (e.g., to prevent damage to a plastic substrate).

The polymeric coating is cured in a curing atmosphere, which will promote crosslinking of the polymer. The curing atmosphere may be either inert or reactive. Inert curing atmospheres include the inert gases, e.g., argon, and also include nitrogen. Reactive curing atmospheres include air, oxygen, water, ammonia, hydrogen, carbon monoxide, nitroxide and the like. Moisture may be used when curing polymers having monomers of formula (VI). Curing may also be effected in an atmosphere which combines two or more of the foregoing, and/or which contains a multiple olefinic component or acetylene to promote crosslinking by hydrosilylation and increase the organic content of the coating. It may also be desirable to cure the coating in an atmosphere containing a nitrogen based donor such as ammonia or an amine, such that a dehydrocoupling reaction is caused to occur between the silicon-hydrogen bonds in the polymer and one or more nitrogen-hydrogen bonds in the nitrogen donor.

A curing solvent (also referred to as a coating solvent) may be used to aid curing, particularly for low temperature cures such as room temperature cures. The curing solvent may be the same as the reaction solvent (i.e., the solvent used during the hydrosilylation and/or dehydrocoupling reaction), or may be different from the reaction solvent. In some preferred embodiments, the curing solvent is added prior to forming a coating with the polymer formulation. In some embodiments, the reaction solvent is removed, and a curing solvent is added prior to forming the coating. In other embodiments, the reaction solvent functions as the curing solvent. During the curing process, the curing solvent may be removed by evaporation, for example, or by lowering the pressure above the coating. The curing solvent may also be removed after the curing is partially complete, or as the curing reaches completion.

The curing solvent may be added to increase the shelf-life of the formulation prior to applying the formulation to a substrate to form a coating. In some embodiments, the curing solvent is a reactive solvent and functions as a curing additive. The curing reagent may therefore be incorporated into the polymer network during the curing, or may modify the polymer in the coating formulation prior to or during the coating.

A curing catalyst may also be used. In some embodiments, the curing catalyst comprises an organic acid, base, or salt, inorganic acid, base or salt, or organometallic compound selected from the metals of Ti, Sn, Zn, Cu, Zr, Si, or Mg.

(a) Curing of Polymers Containing Si—H Bonds

Polymers containing Si—H bonds (e.g., PHMS that has not been completely converted to PHMS-OH via dehydrocoupling) can be cured after coating applications by either dehydrocoupling reactions with crosslinking compounds containing R—(X—H)$_n$, where X is O or NR' and n is $\geq 2$, or by hydrosilylation with compounds having the formula R—(CH=CHR')$_n$ in the presence of an appropriate catalyst, such as those described herein (typically a transition metal catalyst such as Pt, Rh, Ru and Pd catalyst). R can be a hydrocarbyl, organosilane, or siloxane moiety or hydrogen. R' is preferably a hydrogen but can be also a hydrocarbyl, silane or siloxane moiety. Such curing chemistries and catalysts capable of crosslinking polymers containing Si—H bonds have been described in U.S. Pat. Nos. 5,750,643 and 5,990,024. In some embodiments, the curing catalysts will be the same as described for modifying polymers containing Si—H bonds, especially those polymers containing hydrido (hydro) siloxane monomers, [RSiHO].

(b) Catalytic Crosslinking of PHMS by Dehydrocoupling Reaction with Water.

In one embodiment, a high temperature protective paint is formulated from PHMS itself, [RSiHO]$_n$. The original PHMS (or PHMS partially modified according to the methods disclosed herein) containing significant level of Si—H bonds (above 10%) that catalytically dehydrocouple with water, which is introduced into the curing oven in a form of vapor, and react in the presence of dehydrocoupling catalyst embedded in the coating formulation, preferably a ruthenium carbonyl catalyst. The dehydrocoupling reaction is affected by the amount of catalyst used, the curing temperature, and level of moisture. For the original polymers, the rate of reaction increases with the amount of catalyst when the curing temperature is <150° C. The dehydrocoupling reaction is rapid in the presence of a high concentration of catalyst. When curing temperatures around 150° C. or higher are used, a small amount of catalyst (200 ppm) may be used in curing. Thus, the amount of catalyst can be adjusted according to the anticipated curing temperature. For some dehydrocoupling catalysts the curing temperature is limited to prevent decomposition of the catalytic compound. For example, $Ru_3(CO)_{12}$ and its derived active species will decompose between 150° C. and 180° C.

(c) Catalytic Crosslinking of PHMS by Hydrosilylation Reaction.

Alternatively or in addition, polymers possessing Si—H bonds can be crosslinked by hydrosilylation with reagents containing multiple olefinic sites, such as vinyl containing organosilanes and oligosiloxanes in the presence of transition metal catalyst, preferably organometallic Pt catalyst. Room temperature or lower temperatures can be used for curing. Typically, 5 to 10 wt % of the curing reagent and 1 to 50 ppm of catalyst are suitable to efficiently carry out such reactions at a temperature range of 20 to 60° C., provided that the formulation does not contain other additives that can poison the catalyst, such as some S- or N-containing compounds. In some cases the hydrosilylation reaction serves only to promote the initial stage of curing to solidify the deposited formulation. Curing is then continued by the dehydrocoupling reaction with moisture, in the presence of the same catalyst or an additional catalyst that provides better dehydrocoupling reaction rates, formulated in, for example, a paint slurry. In contrast to the crosslinking obtained by dehydrocoupling, the hydrosilylation curing is not expected by itself to enhance bonding of the coating to the substrate. The adhesion to the surface is expected to be inferior to curing by dehydrocoupling process.

(d) Curing of Modified PHMS Polymers Containing Alkoxy Groups

Modified polymers that comprise alkoxy (RO—) groups can be cured by hydrolysis/condensation reactions even at room temperature in the presence of typically 0.1 to 2 wt % of a strong acid such as sulfuric or toluene/sulfonic acid, base such as amines or polyamines, or an organometallic condensation catalysts (as discussed herein). Heating such modified polymers above 150° C., and preferably above 200° C., results in a hydrolysis/condensation reaction without the use of any catalyst.

Modified polymers with partially exchanged alkoxy groups can be cured twice. Initially, the Si—H bonds are activated by the dehydrocoupling (e.g., Ru) catalyst, which may be used for prior polymer modification and may therefore already be present. The alkoxy groups may be subsequently removed on exposure to an appropriate acid or base catalyst by a hydrolysis/condensation reaction. Polymers modified with significant levels of Si—OH groups (above 30%) can be cured even at room temperature in the presence of a condensation catalyst such as described herein.

(e) Crosslinking of Polymers Possessing Si—OH and/or Si—OR by Catalytic Hydrolysis and Condensation Reactions Activated by Acids, Bases and/or Organometallic Compounds.

One preferred embodiment for coating materials uses PHMS modified polymers containing significant level of $[CH_3Si(OH)O]$ monomeric units. These polymers are referred to herein as "PHMS-OH" and are derived from PHMS itself (or slightly modified PHMS) by the dehydrocoupling reaction. Typically, the modified polymers are kept in the reaction solutions and use without further modification for coating formulations. This reuse of the reaction solvent (typically a benign alcohol, for example) provides additional cost saving for methods employing the disclosed polymers and coatings. PHMS-OH based polymers can be formulated as clear coating solutions and slurries and maintain considerable shelve stability even at significant concentration (20 to 40 wt %) because of the relative linearity of the derived polymer (in contrast to a similar branched and semi crosslinked material derived from hydrolysis condensation reaction of $CH_3Si(OR)_3$) ("sol-gel") and because of the fact that no catalyst for hydrolysis or condensations is present in the solution after the modified polymer synthesis. This generic observation is very different from "sol-gel" (i.e., hydrolysis-condensation) technologies and systems, in which strong acidic condition is needed to form polymeric materials from $CH_3Si(OR)_3$ itself or in combination with other alkoxysilane compounds. It is very difficult, if not impossible, to obtain a stable and high concentration solution from such sol-gel technologies without causing gelation in the formulation vessels. One reason for the incapability to stabilize such hydrolysis-condensation products is the presence of acidic or base catalyst in the formulation. Another reason is that by the completion of the hydrolysis the parallel condensation reaction proceeds far enough to result in a highly branched polymer already close to its gel point.

When coatings from polymers containing Si—OH are cured at high temperature such as 150° C., no catalyst is needed. However, when coatings are cured at room temperature, condensation catalysts are needed to accelerate the setting of the formulations even after solvent removal. The catalysts described herein for coating systems generally exhibit the following: (a) good catalytic capability, (b) slow effect on stability of coating solutions or slurries prior to application, and (c) no negative (and potentially a positive) effect on the coating performance after curing (e.g., the catalyst can serves as a corrosion inhibitor, crosslinker or adhesion promoter).

The curing process of the polymers disclosed herein [e.g., PHMS-OH, R-PHMS-OH (hydrosilylated/hydroxylate) and RO-PHMS-OH (akoxylated/hydroxylated) polymers] involves the condensation reaction of Si—OH groups, which can be effectively catalyzed by acids, bases or organometallic compounds. It was found that although acids catalyze the condensation reaction, they can (in some cases) negatively affect the corrosion resistance of the derived coatings. Thus the preferred catalysts for corrosion resistance coatings are organic bases, including those useful in catalyzing the dehydrocoupling reaction, as described previously. Organic bases include: amines, imines, polyamines, polyimines, imidazoles, polyamides, aminosilanes such triethanolamine (TEA), aminopropyl-modified PHMS, polyamide, oligopropyleneamine (i.e., DESMORAPID® PP), $[H_2N(CH_2)_3SiCH_3O]_{4-5}$, $H_2N(CH_2)_3Si(CH_3)_2OSi(CH_3)_2(CH_2)_3NH_2$, $H_2N(CH_2)_3Si(OCH_2CH_3)_3$, $H_2N(CH_2)_2HN(CH_2)_3Si(OCH_2CH_3)_3$, $H_2N(CH_2)_2HN(CH_2)_2HN(CH_2)_3Si(OCH_2CH_3)_3$, aniline, polyetheleneamine, organosalts of amines such as trialkylaminoacetate, amino hydrochloride, trimethylamine, triethylamine, pyridine, and combinations such as TEA/HOAc and TEA/Ti(OBu)$_4$.

Organometallic compounds are also used to catalyze hydrolysis of alkoxy groups and condensation of OH groups bonded to polysiloxanes. For example, organotin and organotitanium compounds are suitable for these purposes. Organometallic compounds of Sn, Zn, Fe, and other organo metal salts can also catalyze the dehydrocoupling reaction between Si—OH and Si—H. Strong acids such as sulfuric, sulfonic, and phosphoric which dissolve readily in alcohols and alcohol-water solvents, are also efficient catalysts. When strong acids are added to coating solutions, the ruthenium carbonyl catalyst (if still present to enhance further dehydrocoupling reactions) completely loses its catalytic ability and the coating slurries are not as stable due to the low pH.

Examples for acid catalysts are HCl, HF, $RCO_2H$ (such as acetic acid), $H_2SO_4$, $RSO_3H$ (such as sulfhonic acid, e.g., paratuluene sulfonic acid), $H_3PO_4$, $RPO_3H_2$ (phosphonic acid), $RPO_2H$ or $R_2PO_2H$ (phosphinic acids) and boric acid. Some of the acids can be also introduced as salts with a counter cation, ammonium or amine compound; examples are $RSO_3Na$, $CH_3COONa$, $CH_3COONH_4$, and $CH_3COOHNCH_3$. Some of these salts provide milder condensation activities or are activated only at elevated temperature (such as above 80° C.). Acid salts that possess volatile amines, such as $CH_3N$ and $C_2H_5N$, as the counter base in the salt, are sufficient as inhibited (blocked) catalysts that are vaporized after heat-induced dissociation from the acid component.

Also, base catalysts can be added to the coating slurry or applied to the coating surface by dipping or spraying after the coatings have been deposited. The base catalysts include inorganic and organic bases that can promote hydrolysis and condensation by nucleophilic attack. Examples are $M(OH)N$ (wherein M is a metal cation such as Li, Na, K, Ca), aliphatic and aromatic amines, and ammonium salts.

The activity of $Ti(OBu)_4$ as a Si—OR and Si—OH condensation catalyst is similar to other Ti and Zr alkoxy, carboxy, or diketonate compounds. Other examples for compounds that can catalyze such condensation are: titanium di-n butoxide (bis-2,4-pentanedionate), titanium diisopropoxide (bis-2,4-pentanedionate), titanium diisopropoxide bis(ethylacetoacetate), titanium 2-ethylhexoxide, tetrakis(trimethylsiloxy)titanium, ammonium titanium lactate, triethanolamine titanium propoxide, triethanolamine zirconium propoxide. Interestingly, these reagents can also serve as crosslinkers, corrosion inhibitors and adhesion promoters when mixed in paint formulations.

Other organometallic compounds that can catalyze hydrogenative condensation reactions between Si—H and Si—OH are metal salts such as zinc octanoate, iron octanoate, and other metals.

Further high-temperature curing of these systems can be achieved in the presence of organic peroxide catalysts such as dichlorobenzoyl peroxide and dicumyl peroxide that crosslink the Si—$CH_3$ groups to form Si—$CH_2$—$CH_2$—Si by redical mechanism at about 150° C. Radical mechanisms can be promoted at lower temperature in the presence of UV radiation and radical initiator.

(f) Formulations with Other Additives

Other additives that can be added are corrosion inhibitors such as sulfonates of Ba, Ca, Mg, and Zn, non volatile amines, especially such that contain conjugated structures such as benzotriazole, anticorrosive pigments such as metal borates, silicates, phosphates, phosphites, and molybdates.

Dispersants and rheology modifiers can be added too, provided that they do not reduce the thermal stability or protection aspects. Siloxane based dispersants, colloidal or fumed silica and alumina can be good candidates as such dispersants or rheology modifiers. Incorporation of fillers is discussed elsewhere in this disclosure.

Depending on the polymer used, the coating is cured at a temperature T, wherein T is below the temperature required for pyrolysis of the silicon-containing polymer used in the coating. Preferably, temperature ranges from room temperature to about 400° C., more preferably from room temperature to about 300° C. and more preferably from room temperature to 150° C. It is typically preferred that the curing temperature do not exceed about 400° C., particularly for preparation of nonwetting coatings. The curing process is carried out for a length of time sufficient to allow for the desired degree of cross-linking within the coating. Such length of time may be up to about 1 week, preferably between about 1 minute and about 3 days. The curing process may also be carried out by briefly and optional repeatedly exposing the coatings to elevated temperatures, for example repeated exposure times of between about 5 seconds and about 1 minute.

The polymeric coating is cured in a curing atmosphere, which will promote crosslinking of the polymer. The curing atmosphere may be either inert or reactive. Inert curing atmospheres include the inert gases, e.g., argon, and also include nitrogen. Reactive curing atmospheres include air moisture, ammonia, hydrogen, and the like. Curing may also be effected in an atmosphere which combines two or more of the foregoing, and/or which contains an olefinic component or acetylene to promote crosslinking and increase the organic content of the coating in the presence of polymer containing Si—H bands and an appropriate hydroxilylation catalyst. The preferred environment Polymers consisting of [RSiH—O] and [$RSi(OR^{10})$—O] is moist air and for polymers consisting of RSi(OH)—O] units is dry air.

Using the methods disclosed herein, a variety of coatings and coated substrates can be prepared. Both pre-cured and post-cured coatings can be prepared according to the methods. In some embodiments, the methods provide a coated substrate comprising a substrate and a coating disposed thereon, wherein the coating comprises: (i) a cured silicon-containing material; and (2) an optional filler material selected from any of the filler materials described herein (e.g., particulate fillers, etc.). The cured silicon-containing material comprises repeat units having the structure of formula (III), (V), (VI), (VII), or combinations thereof:

  (III)

  (V)

  (VI)

  (VII)

wherein:

k1, n1, p1 and q1 represent the fraction of repeat units of the silicon-containing material that have the structural formula (III), (V), (VI), and (VII) respectively;

$R^1$ is $C_1$-$C_{30}$ hydrocarbyl which is optionally substituted and is optionally heteroatom containing; and $R^2$ and $R^3$ are independently selected from H, $C_1$-$C_{30}$ hydrocarbyl, organometallic, halocarbyl, and organosilyl, each of which is optionally substituted and is optionally heteroatom-containing.

In preferred embodiments, n1 has a value between about 0.3 and about 1.0, or n1 has value greater than about 0.3, or a value less than about 1.0. For example, n1 may have a value between about 0.5 and about 0.95. Also in preferred embodiments, q1 has a value between 0 and about 0.8. or q1 has a value that is less than 0.8, or a value that is greater than 0. Also in preferred embodiments, k1 has a value between about 0 and about 0.5, or k1 has a value that is greater than 0, or a value that is less than about 0.5. Also in preferred embodiments, p1 has a value that is less than 0.8, or less than about 0.5, or less than about 0.3.

The coatings provided herein may be used in a wide variety of contexts, insofar as they impart thermal stability and corrosion resistance and other forms of protection on virtually any type of substrate. The coatings may additionally be useful to provide electrical insulation and/or bonding or compatibility interfaces between different types of materials. If it is desired that the coating be nonwetting—i.e., in addition to being thermally stable and, in the case of metal substrates, corrosion-resistant—the coating should be cured in an atmosphere that maximize the conversion of Si—OH to Si—O—Si during the curing.

Coatings may be applied by dipping the substrate to be coated in the aforementioned slurry or flowing through the liquid formulations through cavities in the substrate. Alternatively, the coating formulation may be applied to the substrate by painting, spraying or spin-coating techniques. These procedures will typically provide coatings having a thickness of up to about 10 to 50 µm per coating layer for the cured coatings for corrosion protection, but may provide coatings on the order of 5 µm, or even thinner, if desired, primarily when optical transparency is required and the formulations do not contain fillers. The thickness may be limited by stresses induced during curing, in which (a) solvent and water are released during drying and curing, and (b) a slight shrinkage of the polymer component occurs. Such stresses can lead to delamination or cracking of the coatings. If the desired coating thickness is higher than affordable due to the volume shrinkage, then a multiple layer deposition approach can be used. The multiple layer approach may be comprised of the same or different formulations to provide different functionalities. For example, a base layer can be deposited primarily for corrosion resistance and then a top layer can be deposited to provide appearance, waterproofing, soil resistance, UV protection, etc.

The coatings so provided may be used in a wide variety of contexts, insofar as they impart thermal stability and corrosion resistance on virtually any type of substrate. Some uses are described previously herein. The coatings may also be used to strengthen relatively weak substrates such as glass and, as noted earlier herein, are useful for providing a low or high surface tension. The coatings may additionally be useful to provide electrical or thermal insulation or alternatively electrical or thermal conductivity. It can be used for improving hardness of substrates, plastics in particular or having a decorative or optical function.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

It is to be understood that while the invention has been described in conjunction with the preferred specific embodiments thereof, that the foregoing description as well as the examples that follow, are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains.

The following examples are put forth so as to provide those of ordinary skill in the art with a complete disclosure and description of how to carry out the methods of the invention and make the thermally stable, corrosion-resistant coatings claimed herein, and are not intended to limit the scope of what the inventor regards as the invention. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric.

EXAMPLES

Example 1

General Instructions for Modification of PHMS: The reactor set up should allow venting hydrogen gas that is evolved in this reaction. Catalyst is first dissolved in an appropriate solvent prior to mixing with PHMS. For example, the Ru catalyst used in these examples can be dissolved in a minimum amount of dichloromethane or THF (about 5 to 15 ml) prior to being added to the reaction mixture. The dissolution of the catalyst can be done, for example, by sonicating the catalyst in a vial with solvent. Best results with the $Ru_3(CO)_{12}$ catalyst are achieved using a purified catalyst. For example, the catalyst may be freshly recrystallized from chloroform prior to use.

Example 2

Synthesis of PHMS-OH in ethanol/water solvent. 100 g of PHMS was added to 100 g of ethanol, 67 g of water (2.2 moles water per mole Si—H) and 20 mg Ru catalyst (200 ppm based on polymer) in a 1 L 3-neck flask. The reaction mixture was heated to 50-55° C. in a water bath with vigorous stirring. The creation of gas was observed. Reaction was followed by FTIR (reduction of Si—H band in 2250 to 2100 $cm^{-1}$ region) and was typically finished in 6 h and after an addition of 100 ppm more Ru catalyst. Almost no alcohol reacted with PHMS as detected by NMR spectrum. Typical solids content are 40 to 45 wt % in the reaction solutions and they are formulated with fillers using the reaction solutions. In some cases it is preferred to dry the solution from the excess water. In other cases, the solvent level was reduced or exchanged for a higher boiling point solvent, a preferred choice for numerous paint applications, especially spray coatings.

Example 3

Synthesis of PHMS-OH by using EtOH and adding acetone as a cosolvent. To 150 g EtOH and 30 g distilled water (1:1 molar ration of $H_2O$:Si—H) in a 1 L flask, 100 g PHMS was added with 15 mg of dissolved $Ru_3(CO)_{12}$ as a catalyst. The reaction proceeded under refluxing condition and efficient stirring. Vehement release of $H_2$ was observed when temperature of the system was raised. The reaction subdued in one hour. Vigorous release of $H_2$ resumed when additional 150 ppm of catalyst were added. The solution was refluxed for another 4 h. IR spectrum of the solution was taken to confirm the reaction extent. The reaction was quenched by cooling down the solution at room temperature when the reaction exceeded over 90% of Si—H consumption. The solution was filtered and its weight was adjusted to 300 g (33% based on PHMS) by acetone to increase the shelf stability of the polymer.

Example 4

Synthesis of PHMS-OH by using EtOH and water as cosolvents. To 228 g of EtOH and 212 g distilled water (3.1:1 molar ratio of $H_2O$:Si—H bonds; significant excess of water) in a 2 L flask, 228 g PHMS was added followed by 0.045 g of dissolved $Ru_3(CO)_{12}$ as a catalyst. The reaction was run under refluxing and efficient stirring conditions. Strong release of $H_2$ was observed when temperature of the system was raised. The solution turned to clear in two hours. Reflux was continued for about 4 h till IR spectrum of the polymer showed the reaction extent higher than 90%. The solution was filtered and diluted to 684 g (33% based on PHMS) by adding ethanol.

Example 5

Typical scaled-up synthesis of PHMS-OH. PHMS-OH synthesis in ethanol/water solvent. 100 g of PHMS was added to 100 g of ethanol, 67 g of water (2.2 moles water per mole Si—H) and 20 mg Ru catalyst (200 ppm based on polymer) in a IL 3-neck flask. The reactor set up should allow venting the hydrogen gas that is evolved in this reaction. The mixture was heated to 50-55° C. in a water bath (if run at higher temperature, reaction will go too fast) with vigorous stirring. A lot of gas was created. Reaction was followed by FTIR (reduction of Si—H band in 2250 to 2100 cm$^{-1}$ region) and was typically finished in 6 h and after the addition of 100 ppm more Ru catalyst. Almost no alcohol reacts with PHMS as shown in NMR spectrum. Typical solids content were 40 to 45 wt %.

non-polar solvents in which gelation occurred during the synthesis stage itself. There is an advantage to using an excess of water. The capability to transfer high concentration of water to the solution phase, in which the polymer reactant resides, can be important to obtaining a stable product. The formation of a homogeneous solution at the end of the synthesis is an indicator for a stable product.

The competing kinetics between the formation of Si—OH (from the reaction of Si—H+$H_2O$; a rapid dehydrocoupling reaction) and the formation of Si—O—Si (from the reaction of Si—OH and Si—H; a slower dehydrocoupling reaction) is an influential factor in the product stability. Thus, for example, if higher fraction of Si—OH can be formed before it condenses to Si—O—Si by the slower dehydrocoupling reaction, which can be achieved by rapidly transferring water to the polymer phase in high concentration (initially, the water is immiscible), the PHMS-OH product will be stable.

Furthermore, the condensation reaction of 2 Si—OH groups to Si—O—Si+$H_2O$ is unfavorable under near neutral pH conditions.

| Example # | Mols $H_2O$/ Mols Si—H | Solvent (Wt per 100 g PHMS) | $Ru_3(CO)_{12}$ ppm (Wt cat./Wt PHMS) | PHMS-OH Sol. In Solvent | Results/Observations |
|---|---|---|---|---|---|
| 6 | 2.2 | EtOH (100 g) | 300 | Excellent | Excellent RT Stability, >6 months, at 30 wt % Solids |
| 7 | 1.5 | EtOH (150 g) | 300 | Excellent | Catalyst becomes dark much faster when stored Poor, 7-14 days, RT Stability at 30 wt % Solids |
| 8 | 1.0 | EtOH (150 g) | 300 | Excellent | Catalyst becomes dark much faster when stored Poor RT Stability, 7-14 days, at 30 wt % Solids |
| 9 | 2.2 | Iso-butanol (100 g) | 300 | Excellent | Excellent RT Stability, >6 months, at 30 wt % Solids |
| 10 | 3.0 | Dioxane (150 g) | Ru/300 | Poor | Reaction stayed as emulsion then gelled |
| 11 | 3.0 | 1,2-diethoxyethane (150 g) | 300 | Good, noticed it gets cloudy when more water added | Reaction appeared to go through emulsion, became homogeneous and then became cloudy and gelled. Perhaps too much water |
| 12 | 1.0 | 1,2-diethoxyethane (150 g) | Ru 300 | Good, noticed it gets cloudy when more water added | Reaction through emulsion, became homogeneous and then gelled |

The $^1$H NMR of PHMS-OH reveals the complete disappearance of the Si—H signals at 4.7 ppm (sharp singlet) and the presence of broadened Si—$CH_3$ signal around 0.2 ppm. Only traces of ethoxy groups are observed at 0.9 ppm. A typical $^{29}$Si—NMR spectrum reveals the following signal with their % molar intensity in parentheses: $CH_3Si(OH)O$—59.5 ppm (57%); $CH_3SiO_2$—68 ppm (35%); $CH_3Si(H)O$—49.5 ppm (5%); $(CH_3)_3SiO$ (terminal sites)—6 ppm (3%).

Examples 6-12

Synthesis of PHMS-OH. The reactions shown in the table below summarize various attempts to form PHMS-OH with different solvents and/or molar ratios of water/Si—H and their effects on the solubility and stability of the synthesized PHMS-OH. The observations reveal the following facts. The reaction provides much more stable PHMS-OH in alcohols than in other polar solvents. The results were very poor in Example 13

Synthesis of 20% EtO-80% HO-PHMS (EtO-PHMS-OH). A mixture of 100 g of PHMS, 100 g of ethanol and 5 mg of dissolved Ru catalyst (50 ppm based on polymer) was reacted at a temperature of 55-60° C. Hydrogen gas evolution was observed. The reaction was followed by FTIR (reduction of Si—H band in 2250 to 2100 cm$^{-1}$ region) and when intensity area of Si—H band decreased by 20%, 63.3 g water was added along with additional 20 mg of dissolved Ru catalyst (200 ppm based on polymer). The mixture was then heated to 60-65° C. in a water bath, monitored by FTIR to determine extent of Si—H bond depletion until the Si—H depletion exceeded 95%.

Example 14

Synthesis of 20% EtO-PHMS-OH by using EtOH as a solvent. To 120 g of EtOH in a 1 L flask, 10 g PHMS was added with 0.05 g Ru$_3$(CO)$_{12}$ as a catalyst. The reaction proceeded under refluxing condition and efficient stirring. Vehement release of H$_2$ was observed at the beginning then became mild in about 30 min. The Si—H replacement extent was checked by FT-IR, as described below. When the extent reached 20-25%, a certain amount of water (the amount depending on modification extent with alkoxy groups), calculated to complete the dehydrocoupling of all the remaining Si—H bonds, was added to the solution with 0.015 g catalyst. Vigorous release of H$_2$ resumed and continued for another 30 min. An additional 0.015 g catalyst is added and the solution is refluxed for another one hour. An IR spectrum of the solution was taken to confirm the reaction completion. The reaction was stopped by cooling the solution to room temperature when the level of Si—H was lower than 5 mol %. The solution was filtered through glass wool and stored in a refrigerator for several years. It had a concentration of 42% polymer.

Example 15

Synthesis of close to 100% PHMS-OEt polymer. To 10 g of EtOH in a 500 ml flask, 100 g PHMS was added with 0.015 g of dissolved Ru$_3$(CO)$_{12}$ as a catalyst. The reaction proceeded under refluxing condition and efficient stirring. Very strong release of H$_2$ was observed when the temperature of the reaction was raised. The reaction subdued in one hour. Vehement release of H$_2$ resumed when 150 ppm more catalyst was added. The solution was refluxed overnight. IR spectrum of the solution was taken to monitor the reaction progress. The reaction was stopped by cooling the solution at room temperature when the extent of reaction was higher than 90%. The solution was filtered and its weight was adjusted to 200 g (50% based on PHMS-OH).

Example 16

Synthesis of 10 mol % Styryl-PHMS-OH. 10 mol % is based on 35 Si—H units per mole of PHMS (MW ~2000), as identified by NMR. Therefore, 3.5 moles of styrene were per mole of PHMS were calculated as 10% replacement. 100 g of dry PHMS (stirred over CaH$_2$ chips (do not use powder form) overnight and filtered; can then be stored over molecular sieves) and 17 g of dry styrene dried by molecular sieves (10 mol % is based on 35 Si—H units per mole of PHMS (MW ~2000), as identified by NMR. Therefore, 3.5 moles of styrene were per mole of PHMS were calculated as 10% replacement) were mixed into in a 1 liter 3 neck flask fitted with a condenser and a gas inlet and outlet (to bubbler). The flask was purged with argon (or nitrogen) for 10-15 minutes and 5 ppm (Weight Pt complex/weight PHMS) of the Pt catalyst (Platinum-Divinyl Tetramethyl-Disiloxane, (Gelest #SIP6831.0, this comes as an approx. 2% solution and must be significantly diluted in dry xylenes before adding a precise amount) were added. The mixture was stirred, under dry inert atmosphere at room temperature until an exotherm was observed (the solution becomes warm), typically less than 30 minutes. (Note: in some cases (especially with vinyl compounds that are sterically hindered) a mild heating at 30-35° C. is used). To verify that the reaction was complete, aliquots were analyzed by NMR. Failure to observe vinyl peaks at 6-6.5 ppm confirmed the reaction had reached completion. The intermediate product is 10% modified polymer (10% styryl-PHMS).

The 10% Styryl-PHMS-OH was then generated using the same protocols as that used for making PHMS-OH. For example, 100 g of the 10% styryl-PHMS was added to 100 g of ethanol, 67 g of water (2.2 moles water per mole Si—H) and 20 mg Ru$_3$(CO)$_{12}$ catalyst (200 ppm based on polymer) in a 1 L 3-neck flask. Mixture was heated to 50-55° C. in a water bath with vigorous stirring. A lot of gas was created. Reaction was followed by FTIR (reduction of Si—H band in 2250 to 2100 cm−1 region) and was typically finished in 6 h and after the adding 100 ppm more of the Ru catalyst. Almost no alcohol reacted with the hydrido-siloxane as revealed in NMR spectrum. Typical solid contents were 40 to 45 wt %.

Examples 17-35

Effects of Active Reagents, Ratios, Catalyst and Reaction Conditions on the Formation and Stability of PHMS-OH and Substituted PHMS-OH. The following set of reactions provides indications about how the formation of PHMS-OH and substituted PHMS-OH are affected by the reaction conditions and relative quantities. It also indicates capabilities to perform or not perform both hydrosilylation and dehydrocoupling reactions simultaneously. The analysis of the examples also reveals significant differences between Ru and Pt catalyzed reactions regarding their relative hydrosilylation, dehydrocoupling of water and dehydrocoupling of ethanol kinetics.

| Example # | Solvent/Wt per 100 g PHMS | Mols H$_2$O/ Mols Si—H | Catalyst/ppm (Wt cat/Wt PHMS) | Solubility of PHMS-OH | Results/Observations |
|---|---|---|---|---|---|
| 17 | EtOH/100 g | 2.2 | Ru/300 | Excellent | Excellent RT Stability, >6 months, at 30 wt % Solids; |
| 18 | EtOH/150 g | 1.5 | Ru/300 | Excellent | Catalyst becomes dark much faster when stored; Poor RT stability - 7-14 days at 30 wt % solids. |
| 19 | EtOH/150 g | 1.0 | Ru/300 | Excellent | Catalyst becomes dark much faster when stored; Poor RT Stability - 7-14 days, at 30 wt % Solids |
| 20 | Iso-butanol/100 g | 2.2 | Ru/300 | Excellent | Excellent RT Stability, >6 months, at 30 wt % Solids |
| 21 | Iso-butanol/100 g | 1.2 | Ru/300 | Excellent | Reaction proceeded similarly to the reaction with EtOH. |
| 22 | Dioxane/150 g | 3.0 | Ru/300 | Poor | Reaction stayed as emulsion then gelled. |

| Example # | Solvent/Wt per 100 g PHMS | Mols H₂O/ Mols Si—H | Catalyst/ppm (Wt cat/Wt PHMS) | Solubility of PHMS-OH | Results/Observations |
|---|---|---|---|---|---|
| 23 | 1,2-diethoxyethane 150 g | 3.0 | Ru/300 | Good: noticed it gets cloudy when more water added | Reaction goes through emulsion, became homogeneous and then became cloudy and gelled. |
| 24 | 1,2-diethoxyethane 150 g | 1.0 | Ru/300 | Good, noticed it gets cloudy when more water added | Reaction through emulsion, became homogeneous and then gelled. |
| 25 | MEK | 2.2 | Ru/300 Catalyat added in 60 ppm aliquots | Excellent | No reaction (as observed by monitoring Si—H using FTIR) when the catalyst is added in small aliquots |
| 26 | Ethoxyethanol | 2.2 | Ru/450 | good | Reaction slow relative to EtOH, took 1.5 times normal Ru catalyst and 2 times usual time; |
| 27 | Isopropanol | 2.2 | Ru/300 | Excellent | Reaction proceeded as normal |
| 28 | Pentanol | 2.2 | Ru/300 | Good | Reaction proceeded as with EtOH; Stability Excellent at 60 Days |
| 29 | EtOH/H₂O | 2.2 | Ru/100 Reaction stopped on purpose after conversion of 50% Si—H | Excellent | Reaction stopped at 50% Si—H remaining; Without the removal of the catalyst, the ~40 wt % solution was gelled after 2 days at RT. After catalyst removal (by alumina and activated carbon) the solution remained stable for 45 Days then Gelled. FTIR indicates little change in Si—H to Si-Me ratio over 45 days |
| 30 | MEK/H₂O (amount of MEK to replace 20 mol % of Si—H) | 2.2 | Ru/300 Catalyst added in 60 ppm aliquots | Excellent | Heated to 60° C., no reaction (no reduction of Si—H to Si-Me ratio by FTIR observed), no NMR obtained. |
| 31 | MEK to replace 20% of Si—H) | 0 | Ru/120 Catalyst added all at once | Excellent | MEK reacts through efficient hydrosilylation reaction forming quantitatively to isobutoxy observed, NMR indicates no reduction in Si—H to Si-Me ratio. Drying of the solution reactants seems to be important. |
| 32 | MEK (MEK to replace 100% of Si—H); 10.0 g PHMS (dried); 11.2 g MEK (dried) | 0 | Ru/500 Catalyst added all at once | Excellent | MEK reacts at reflux through efficient hydrosilylation reaction forming quantitatively to isobutoxy. After 3 h 75% of the Si—H and 71% of the MEK have reacted according to NMR. |
| 33 | 20 mol % of MEK reacted first with dry H₂O to replace 20% of Si—H). Only then the water was added in ethanol solution (EtOH:H₂O = 4:1 wt ratio) added after completion of the reaction with MEK | 2.2 (added after MEK reaction) | Ru/300 Catalyst added all at once (appears to make big difference) | Excellent | 300 ppm Ru catalyst added to PHMS + MEK and heated to 60° C., after 2 hours NMR shows no MEK left and 20% reduction in Si—H to Si-Me ratio. H₂O and EtOH added and reaction proceeded to completion without any additional catalyst. Stability Excellent at 50 Days |

| Example # | Solvent/Wt per 100 g PHMS | Mols H₂O/ Mols Si—H | Catalyst/ppm (Wt cat/Wt PHMS) | Solubility of PHMS-OH | Results/Observations |
|---|---|---|---|---|---|
| 34 | EtOH/H$_2$O | 2.2 | Pt only-total catalyst addition - 20 ppm | Excellent | Reaction proceeded well (as observed by reduction in Si—H to Si-Me ratio by FTIR) with initial 2-4 ppm Pt catalyst to approx. 25% Si—H reacted and then only went to approx 30% Si—H reaction with additional 16 ppm Pt cat. |
| 35 | Octene level to replace 10 mol % of Si—H)/ EtOH/H$_2$O | 2.2 | Pt then Ru Final Pt addition was 25 ppm in 5 ppm aliquots using solution of 5 × 10⁻⁴ g Pt/g solvent 3 aliquots of 6 ppm Ru in dichloromethane added to excel the reaction with water before reaction gelled | Excellent | After Pt Final Catalyst and BEFORE Ru addition NMR indicated that the Pt catalyst can react simultaneously as hydrosilylation and dehydrocoupling reaction where the hydrosilylation is most reactive followed by the reaction with alcohol and water. This is in a complete contrast to the Ru$_3$(CO)$_{12}$ reactivity where the activity with water is much greater than alcohol (almost exclusive in the presence of large excess of water) and the hydrosilylation of regular olefins is completely suppressed. After the Pt catalysis the NMR revealed the following stoichiometry: 75.4% Si—H; 9.5% Si-Octyl; 8.3% Si-Ethoxy; 6.8% Si—OH (from subtraction of above) Last NMR obtained AFTER Ru (2$^{nd}$ aliquot) indicated: 24.4% Si—H; 9.8% Si-Octyl; 19.5% Si-Ethoxy; 46.3% Si—OH (from subtraction of above) Reaction then GELLED |

Examples 36-40

The Efficiency of Ru$_3$(CO)$_{12}$ Catalyst Versus Acids and Bases in the Promotion of Dehydrocoupling Reactivity During the Formation of Polymers from Phenylsilane

Example 36

Reaction of PhSiH$_3$ with Sub-stoichiometric Amount of Water in the Presence of Ru$_3$(CO)$_{12}$ Catalyst. An amount of 5.0 g PhSiH$_3$ was mixed with 5.0 g of THF containing 5.0 mg Ru$_3$(CO)$_{12}$ pre-dissolved in the solvent. An amount of 0.83 g water (around 1 eq relative to PhSiH$_3$) was added. Not all the water dissolved. Gas slowly released at RT while stirring the solution. The solution was brought to reflux exhibiting slow release of hydrogen. The reflux was kept overnight and no additional gas release was observed. The solution was a clear blue. Another portion of 0.41 g water was added and the reaction re-started immediately turning the solution color to greenish and then yellow. Finally, the solution color became a very light yellow. The final product is a very viscous liquid that according to NMR has the following formulation: [Ph-SiO(H)]$_{0.35}$[PhSiO(OH)]$_{0.65}$.

Example 37

Reaction of PhSiH$_3$ with Excess Amount of Water in the Presence of Ru$_3$(CO)$_{12}$ Catalyst. Phenylsilane (1.08 g, 0.01 mol) was mixed with 3.0 g of THF in which 21 mg of Ru$_3$(CO)$_{12}$ were added (1 mol % of "Ru"). Then, 0.72 g of water (0.04 mol) were added. At the beginning there were two phases in the solution. The minor one is at the bottom, assuming to be water. The evolution of gas began only after vigorous magnetic stirring is applied. Approximately half of the Ru catalyst precipitated in the stirred solution. The reaction flask equipped with a stopcock with a rubber hose connected to a bubbler was placed in a water bath, kept at 22° C. for the entire reaction. The water did not dissolve well in the solution at the beginning. The bubbling rate was about 2.0 cc per min for over 2 h and then starts to slow down. NMR reveals 29.4% reaction after 1 min (in-spite of the catalyst partial precipitation).

Example 38

Reaction of PhSiH$_3$ with Water in the Presence of an Organic Base Catalyst. Phenylsilane (1.08 g, 0.01 mol) was dissolved in 3.0 g of THF. Then, 0.032 g of Desmorapid PP (an oligo-aliphatic amine used for curing polyurethanes) were added (3 wt %; ~2.2 mol %) and finally, 0.72 g of water (0.04 mol). At the beginning there were two phases in the solution. The minor one at the bottom was water and it remained as a separate phase throughout the entire reaction. The evolution of gas began only after vigorous magnetic stirring is applied. (The pH of a separate water/catalyst solution with the same weight ratios was measured as 9.6.) The reaction flask was equipped with a stopcock with a rubber hose connected to a bubbler was placed in a water bath, kept at 22° C. for the entire reaction. The water did not dissolve well in the solution throughout the reaction. The bubbling rate was about 4 cc per min for over 2 h and then starts to slow down. According to NMR the reaction was progressed 35% after 1 h and at least 95% completed after 6 h. A combination of liquid plus solid product is obtained after drying the excess of water over $MgSO_4$ and rotor-evaporation of the solvent. The end product yield is 1.45 g assumed to have the approximate structure of $[PhSi(OH)_2O_{0.5}]_c[PhSi(OH)O]_d[PhSiO_{1.5}]_e$.

Example 39

Reaction of $PhSiH_3$ with water in the Presence of an Tetraphenylborate Sodium Salt. Phenylsilane (1.08 g, 0.01 mol) was dissolved in 3.0 g of THF. Then, 0.034 g of sodium tetraphenylborate were added (3.1 wt %; 1 mol %) and finally, 0.72 g of purified water (0.04 mol). At the beginning there are two phases in the solution. The minor one at the bottom is water and it remained as a separate phase through. The evolution of gas begins only after vigorous magnetic stirring is applied. (The pH of a separate water/catalyst solution with the same weight ratios was measured as 8.5.) The reaction flask was equipped with a stopcock with a rubber hose connected to a bubbler was placed in a water bath, kept at 22° C. for the entire reaction. The water did not dissolve well in the solution throughout the reaction. The bubbling rate was about 2 cc per min for over 2 h and then starts to slow down. According to NMR the reaction was progressed 35% after 1 h and 48% after 2 h. A combination of liquid plus solid product is obtained after drying the excess of water over $MgSO_4$ and rotor-evaporation of the solvent. The end product yield is 1.45 g assumed to have an approximate structure of $[PhSi(H)_2O]_a[PhSiHO_{1.5}]_b[PhSi(OH)_2O_{0.5}]_c[PhSi(OH)O]_d[PhSiO_{1.5}]_e$.

Example 40

Reaction of $PhSiH_3$ with Water in the Presence of an Organic Base Catalyst. Phenylsilane (1.08 g, 0.01 mol) was dissolved in 3.0 g of THF. Then, 0.016 g of Desmorapid PP were added (1.5 wt %; ~1 mol %) and finally, 0.72 g of water (0.04 mol). At the beginning there are two phases in the solution. The minor one is at the bottom, assuming to be water. The evolution of gas begins only after vigorous magnetic stirring is applied. The solution's pH was around 9.6. The reaction flask equipped with a stopcock with a rubber hose connected to a bubbler was placed in a water bath, kept at 22° C. for the entire reaction. The bubbling rate was about 2.5 cc per min for over 2 h and then starts to slow down. NMR reveals 21% reaction after 80 min. After 24 h all the Si—H groups have disappeared. The end product was assumed to have an approximate structure of $[PhSi(OH)_2O_{0.5}]_c[PhSi(OH)O]_d[PhSiO_{1.5}]_e$.

COATING FORMULATION EXAMPLES

Examples 41-45

Effect of Powder Fillers. Systematic adjustments of the polymer/powder ratio, selection of the solvent, and modification of the polymer and amount of catalyst resulted in the formation of high-performing coatings using selected powders as fillers. The optimal polymer/powder ratio depends on the type of powder and needs to be determined for each specific powder because of the effects of particle characteristics, especially surface area, shape, density and bonding to the polymer. Too much polymer or solvent results in cracked coatings. Too little polymer or a polymer that does not cure or gel in a reasonable time results in soft or non-adhering coatings. Some powders have an effect on the catalytic behavior. For example, Zn dust accelerated the condensation of Si—OH functional groups and caused short pot-life. The table below illustrates the effects associated with variations of polymer/powder ratios and solvent level on the cured coating characteristics.

Many fillers, high-quality produced alumina, silica, and titanium dioxide, were found to be suitable for certain formulations or environments. Other powder fillers successfully used include aluminum flakes and zinc dust (both can be sacrificial layers), iron-oxide, mullite, silicon nitride, silicon carbide, carbon black, tungsten sulfide, black spinnel pigments. The metallic fillers were not suitable for strong acidic conditions, because of their chemical reactivity, but were useful for other corrosive and high temperature conditions. In severe acidic conditions (pH ~0), surface defects were avoided, as they permit the acid to attack the metal (especially aluminum) and form soluble metal chlorides. In contrast, physical defects in coatings tested in salt environments caused only local pitting and corrosion of the metal substrate, but the coated area is not affected and not severely corroded under the coated area. Coating formulations made into self-standing materials ("composites") by curing the bulk without a substrate were stable even in acidic conditions. However, different environmental conditions and substrates require adjustment of coating formulations and catalytic systems. The table below illustrates such observations.

| Example # | Polymer[1] (PMHS) | Powder[1] ($Si_3N_4$) | Solvent[1] (Cyclohexane) | Appearance of Coating After Curing[2] |
|---|---|---|---|---|
| 41 | 1 | 3 | 5 | Loosely bonded, soft, easily removed |
| 42 | 1 | 2 | 4 | Loosely bonded, soft, easily removed |
| 43 | 1 | 1.5 | 3 | Strongly bonded, hard |
| 44 | 1 | 1 | 2 | Strongly bonded, hard, some cracking |
| 45 | 1 | 0.5 | 1 | Cracked coating |

[1]Ratio is measured by weight;
[2]The polymer was unmodified PHMS. All coatings contained 1000 ppm Ru catalyst (based on polymer) and were cured overnight at 150° C. in humid atmosphere.

Experiments 46-65

Additional Effects of fillers. The tables below give results obtained from coatings prepared from PHMS-OH polymer with different ratios of fillers. From the data, it can be seen that cracking happens to coatings cured at 100° C. when filler load is low. Cracking is eliminated after filler load is increased to certain level, depending on the filler. Coatings can be obtained that are stable to higher than 600° C. without cracking. Generally, thicker coatings (>50 um) crack more easily than thinner ones (20-30 um).

Gloss of coating disappears when filler load reaches certain level. Also, room temperature cured coatings with low filler load perform better in NaCl fog test.

| Test | Ratio of TiO$_2$ to PHMS-OH | | | | | | |
|---|---|---|---|---|---|---|---|
| | Exp. 46 1.7:1 | Exp. 47 2:1 | Exp. 48 2.4:1(3:1) | Exp. 49 3.2:1(4:1) | Exp. 50 4:1 (5:1) | Exp. 251 4.7:1(6:1) | Exp. 252 5.6:1(7:1) |
| gloss (without catalyst) | Shining | Shining | Shining | Shining | Shining | no shining | no shining |
| Heated to 100° C. | OK, poorer corrosion resistance than RT, | OK but, peeling off in NaCl box for 3 days | OK, no cracking | OK, no cracking | OK, no cracking | OK, no cracking | OK, no cracking |
| NaCl fog test, three layer cured at 100° C. | RT cure is better than 100° C. cure, RT cured is good for one month | peeling off in NaCl box for 3 days | some defect caused by cracking in 3 day | some defects in 2 days, caused by cracking | good for 4 weeks | corrosion developed from edges, poorer than 5:1 | good for two weeks |
| heated to 200° C., three layers | cracking | cracking | cracking | cracking for three layers | Cracking | no cracking | no cracking |
| 550° C., one layer | | | cracking seen by microscopy | cracking seen by microscopy | looks good, cracking seen by MS | looks good, cracking seen by MS | minor cracking seen by MS |

| Test | Ratio of Al$_2$O$_3$ to PHMS-OH | | | | | | |
|---|---|---|---|---|---|---|---|
| | Exp. 53 1.7:1 | Exp. 54 2:1 | Exp. 55 2.4:1(3:1) | Exp. 56 3.2:1(4:1) | Exp. 57 4:1 (5:1) | Exp. 58 4.7:1(6:1) | Exp. 59 5.6:1(7:1) |
| gloss (without catalyst) | Shining | Shining | Shining | Shining | Shining | no shining | no shining |
| Heated to 100° C. | OK, poorer corrosion resistance than RT, | OK | OK, no cracking | OK, no cracking, | OK, no cracking, | OK, no cracking | OK, no cracking |
| NaCl fog test, three layer at 100° C. | RT cure is better than 100° C. cure, good for 3 weeks | some defect caused by cracking | some defect caused by cracking in 3 day | some defects in 2 days, caused by cracking | good for two weeks, then cracking | corrosion developed from edges, poorer than 5:1 | good for two weeks, then cracking |
| heated to 200° C. | cracking | cracking | | cracking for three layer coatings | some cracking | no cracking | |
| 550° C., one layer | | | cracking seen by MS | cracking seen by MS | no cracking for thin coating | no cracking | no cracking |

| Test | Ratio of SiO$_2$ to PHMS-OH | | | | Ratio of Zn to PHMS-OH | |
|---|---|---|---|---|---|---|
| | Exp. 60 1.7:1 | Exp. 61 2.8:1 (3.5:1) | Exp. 62 3.2:1 (4:1) | Exp. 63 4:1 (5:1) | Exp. 64 6:1 (containing TiO$_2$) | Exp. 65 7.9:1 (10:1 only Zn) |
| gloss (without catalyst) | No shining | No shining | No shining | No shining | No shining | No Shining, Poor or very thin layer due to poorer dispersed solution |

-continued

| | | | | | | |
|---|---|---|---|---|---|---|
| Heated to 100° C. | cracking and peeling off | OK, no cracking, (cracking when too thick) | OK, no cracking | OK | OK | OK, no cracking |
| NaCl fog test, three layer at 100° C. | RT cure is better than 100° C. cure | | good for 1000 hours | good for 1000 hours | good for 1000 hours | good for 1000 hours |
| heated to 200° C., three layer | cracking | | minor cracking | cracking (too thick) | OK | OK |
| 550° C. | | look good, cracking seen by MS | cracking seen by microscopy | no cracking | cracking seen by MS | good no cracking |

Note:
Data in parentheses is based on ratio of PHMS:Filler.

Example 66

Effects of high ratio of filler to polymer. A relationship exists between coating performance in corrosion resistance test and ratio of filler to polymer. When the ratio is low (such as PHMS:$TiO_2$<4:1), room temperature cured coatings perform better in corrosion resistance test than 100° C. cured ones, possibly because cracks are created due to over crosslinking when the coatings are cured at 100° C. When the ratio is higher than 4:1 in the case of $TiO_2$, room temperature cured coatings have poorer corrosion resistance properties, possibly because the extent of crosslinking achieved at room temperature is not enough to provide good mechanical properties and good bonding to the surface for the coatings. Coatings cured at 100° C. with a ratio higher than 4:1 have good mechanical properties and good bonding to surface. No cracking is observed because coatings have low crosslinking density among polymer chains. Ratios of filler/polymer (PHMS-OH) that gives the best performance in corrosion test when coatings are cured at 100° C. are 5:1 for $TiO_2$ and $Al_2O_3$, 4:1 for $SiO_2$, and 8:1 for Zn dust. When coatings are heated to higher temperature (>200° C.), almost all active groups are destroyed. Coatings reach highest possible crosslinking density. In order to prevent cracking, higher ratio of filler to polymer can be used. Ratios of filler/polymer (PHMS-OH) that gives the best temperature resistance coatings are 8:1 for $TiO_2$, 7:1 for $Al_2O_3$, 5:1 for $SiO_2$, and 10:1 for Zn dust. These coatings are stable to temperature >600° C. without cracking.

Modified Wettability

Examples 67-71

Wettability and stabilization of PHMS based slurries. Commercially available PHMS and cyclohydridomethylsiloxanes (CHMS) have a low viscosity and low surface tension and wet surfaces very poorly. They are incompatible with water, eliminating water as a solvent or cosolvent in their original form. The filler powders do not disperse well in solvents and settle rapidly. Nonuniform coatings that crack during the curing process are typically obtained using such powder/PHMS coating slurries. To improve the internal and external wetting characteristics a small degree of the PHMS' Si—H functional groups were converted to Si—OH (1 mol % based on the polymer) by the dehydrocoupling reaction with water using cyclohexane as a solvent and a ruthenium catalyst [$Ru_3(CO)_{12}$] followed by poisoning or removal of the catalyst. The resulting polymers are very stable and give better coating slurries, although the stability depends on the filler. Some are stable for several months and others only for a week in the refrigerator as illustrated in the table below. Pressure can build up inside containers because the dehydrocoupling reaction may continue in the slurries if traces of water or alcohol or any other protic compounds are still present. Alternatively, the catalyst can be added just prior to application. The table below gives formulations for slurries of various powders using PHMS as the binder and 500 ppm of catalyst. Although stable slurries could be made, further polymer improvements were required to produce uniform coatings. These formulations still requires moisture once they are cured in a coating form.

| Example # | Filler Powder | Weight Ratio Powder:PHMS[1]:Cyclohexane | Slurry Stability | Coating[2] |
|---|---|---|---|---|
| 67 | SiC | 1:0.5:1 | >1 month | nonuniform |
| 68 | $Si_3N_4$ | 1:0.625:1 | >2 months | nonuniform |
| 69 | BN | 1:0.67:1.67 | >2 months | nonuniform |
| 70 | $TiO_2$ | 1:0.5:0.8 | 1 week | nonuniform |
| 71 | Al/mullite (1:1) | 1:0.5:1.5 | >4 months | uniform |

[1]500 ppm of $Ru_3(CO)_{12}$ catalyst, based on polymer;
[2]After curing at 150° C., some cracking in nonuniform parts.

Formulations Based on PHMS-OH

Example 72

Wettability and stability of PHMS modified by water. Suitable conditions for the dehydrocoupling reaction between PHMS and water to create PHMS-OH polymer are described in the present disclosure. In one embodiment, substantially all Si—H are replaced by Si—OH groups. The modified polymer is very stable in the presence of alcohol solvents and has an excellent wetting ability on surfaces of substrates including metal, glass, plastic materials and so on. It can be used to prepare coatings on inert surfaces such as polyethylene or Teflon after surface pretreatments such as corona discharge.

Example 73

Coatings based on PHMS-OH. The type of coating system is based on using PHMS-OH is widely used for coating formulations using the disclosed technology. The stability of the coating formulations depends on the concentration of polymer, type and amount of fillers, amount of condensation catalyst, type of solvent, and the presence of a catalyst. This type of the coatings can be cured at ambient temperature in the presence of a curing catalyst and show good corrosion protection and hardness properties. Thermal curing provides typically better performance.

The coating slurries usually have limited shelf life from several days to months after all ingredients are mixed together (i.e., when a catalyst is added). Longer shelf life can be obtained when materials are supplied in two package system, one for the polymer solution and the other for filler and curing catalyst in solvent.

Example 74

Preparation of PHMS-OH formulation for transparent (clear) coatings (polymer only coatings). PHMS-OH polymer/EtOH was diluted to desired concentration such as 33%, 25%, 20%, or 15% (based on the weight of PHMS) by acetone, ethanol, isopropanol or isobutanol depending on the application requirements. While in dip coating a highly volatile solvent is preferred, a low volatility solvent is better for spray and spinning techniques. In some cases, an organic base was added as a condensation catalyst in 0.5 to 2 wt % quantities. Typical catalyst are amines, oligoamines, aminosilanes, alkoxymetals (Ti, Sn, Zn), and carboxylates. Most are used in the Si—OH condensation and curing of epoxy or urethane systems.

Examples 75-78

Preparation of slurry coating formulations by using PHMS-OH in ethanol and acetone. The filler and polymer solutions were mixed. Triethanol amine (0.5% based on the weight of the PHMS-OH polymer) was added as a condensation catalyst. The mixture was ball-milled for about 2 h before use. The viscosity of the slurries can be adjusted by using acetone or other organic solvents (preferably polar ones, most likely alcohols) as a co-solvent. Other co-solvents can be as such that are exempt from the VOC list. Specific formulations using 33 wt % PHMS-OH solution in ethanol that were cured at room temperature are shown in the table below.

|  | Example 75 | Example 76 | Example 77 | Example 78 |
|---|---|---|---|---|
| Filler | $TiO_2$ | $Al_2O_3$ | $SiO_2$ | $Zn/TiO_2$ |
| Weight of filler (g) | 18 | 18 | 18 | 25/5 |
| Weight of PHMS-OH (g) | 6 | 6 | 9 | 5 |

Examples 79-82

Preparation of coating slurries by using PHMS-OH polymer in EtOH and water. General formulation procedures were as reported previously, but no catalyst was added. The mixtures were ball-milled for about 2 h before use. The viscosity of the slurries can be adjusted by using water/ethanol (4/6) solution. Specific formulations using a 33 wt % PHMS-OH solution are shown in the table below.

|  | Example 79 | Example 80 | Example 81 | Example 82 |
|---|---|---|---|---|
| Filler | $TiO_2$ | $Al_2O_3$ | $SiO_2$ | $Zn/TiO_2$ |
| Weight of filler (g) | 18 | 18 | 18 | 32/3 |
| Weight of PHMS-OH (g) | 6 | 6 | 9 | 5 |

Examples 83-86

Preparation of coating slurries from higher concentration of PHMS-OH in EtOH for high temperature resistant coatings. General procedures were as reported previously, but no catalyst was used here. The mixture was ball-milled for about 2 h before use. The viscosity of the slurries can be adjusted by using water/ethanol (4/6) solution. Specific coatings based on formulations using 38 wt % PHMS-OH solutions and cured at 150° C. are described in the table below.

|  | Example 83 | Example 84 | Example 85 | Example 86 |
|---|---|---|---|---|
| Filler | $TiO_2$ | $Al_2O_3$ | $SiO_2$ | $Zn/TiO_2$ |
| Weight of filler (g) | 25 | 25 | 17 | 45/5 |
| Weight of PHMS-OH (g) | 9.4 | 9.4 | 9.0 | 13.1 |
| EtOH (or acetone) | 2 | 2 | 4 | 0 |

Coating Formulations Using RO-PHMS

Examples 87-92

Improved wettability by RO-PHMS. Using the methods described herein, PHMS can be modified through the dehydrocoupling reaction to create RO-PHMS polymers (i.e., PHMS polymers modified by forming Si—OR groups from a portion of the Si—H groups) by using, for example, $Ru_3(CO)_{12}$ as a catalyst and alcohol as a solvent. Wettability of the polymer increases with the extent of modification, as shown in the table below. The modified polymers have excellent stability in absence of hydrolysis catalysts such as acids and bases. The modified polymers have good wettability when used in slurry formulations, and they demonstrate good dispersion capability as shown in the table below.

| Example # | Modification | Si—OMe % | Si—H % | Si—OH % or Si—O—Si % | Wetting ability |
|---|---|---|---|---|---|
| 87 | Original | 0 | 90 | 10 | No |
| 88 | 1% $H_2O$[1] | 0 | 84 | 16 | Poor |
| 89 | 33% MeOH[2] | 22 | 62 | 16 | Poor |

| Example # | Modification | Si—OMe % | Si—H % | Si—OH % or Si—O—Si % | Wetting ability |
|---|---|---|---|---|---|
| 90 | 50% MeOH[2] | 27 | 58 | 15 | Moderate |
| 91 | 70% MeOH[2] | 54 | 36 | 10 | Good |
| 92 | 75% MeOH[2] | 57 | 33 | 10 | Good |

[1] Based on weight of PHMS.
[2] Based on theoretical amount of Si—H bonds in original PHMS; 1% of water was also reacted with polymers.

Example 93

General approach for EtO-PHMS formulations. In a second type of coating system, ethanol modified polymer (EtO-PHMS) was used as the sole coating material or as a binder. The coating slurries were very stable when kept in moisture-proof containers (permanent stability). The Coatings can be well cured at ambient temperature in the presence of an appropriate catalyst and the fully mixed coating slurries can be supplied in one package. However, good hydrolysis catalysts are necessary in this case and the time to set the coatings is much longer than in the case of PHMS-OH or EtO-PHMS-OH.

Example 94

Preparation of coating solutions for transparent coatings (polymer only coatings). The PHMS-OEt polymer was diluted by ethanol to desired concentration such as 33%, 25%, 20%, or 15% (based on the weight of PHMS). Ti(OBu)$_4$ and NH$_4$F were used as the cocatalyst. Amount of Ti(OBu)$_4$ and 2% NH$_4$F in methanol is each 5% based on the weight of PHMS.

Example 95

Preparation of pigmented (colored) coating slurries with PHMS-OEt as a binder. The pigments (Irgazin DPP Red BO, Irgazin Blue ATC, or Magenta B RT-343-D, 8% based on the weight of PHMS polymer) were mixed with 50% PHMS-OEt solution. The same amount of Ti(OBu)$_4$ and NH$_4$F as identified above was used as the cocatalyst. After ball-milled for 4 h, the pigment well dispersed in the polymer solution.

Example 96-99

Preparation of filled coating slurries by using PHMS-OEt as a binder. Typical procedures of preparing coating slurries are based on mixing the filler and binder in the ratios given below. Ti(OBu)$_4$ and 2% NH$_4$F were used as the cocatalyst (each 5% based on the weight of the PHMS polymer). The mixture was ball-milled for about 2 h before use. Viscosities can be adjusted using ethanol. Specific formulations using 50 wt % PHMS solution are provided in the table below.

|  | Example 96 | Example 97 | Example 98 | Example 99 |
|---|---|---|---|---|
| Filler | TiO$_2$ | Al$_2$O$_3$ | SiO$_2$ | Zn/TiO$_2$ |
| Weight of filler (g) | 18 | 18 | 18 | 30/3 |
| Weight of PHMS (g) | 6 | 6 | 9 | 5 |

Examples 100-104

Stability and uniformity of formulations based on EtO-PHMS. The modified polymers were suitable for forming thick coatings (50 to 150 μm) that bonded strongly to metals and other inorganic surfaces. The polymers (PHMS and CHMS) were modified by a reaction with methanol, ethanol, and water in the presence of 500 ppm of the ruthenium catalyst. Alkoxy groups were substituted (or partially substituted) for the Si—H groups, improving the wetting and spreading and the stability of the slurry. Typical formulations of slurries made of ethoxy modified PHMS are displayed in the table below.

| Example # | Filler Powder | Weight Ratio Powder:EtO-PHMS[1]:Cyclohexane | Slurry Stability[2] | Coating[3] |
|---|---|---|---|---|
| 100 | SiC | 1:2:0.3 | stable | uniform |
| 101 | Si$_3$N$_4$ | 1:2:0.3 | stable | uniform |
| 102 | Al$_2$O$_3$ | 1:0.86:0 | stable | uniform |
| 103 | TiO$_2$ | 1:0.75:0.25 | stable | uniform |
| 104 | SiO$_2$ | 1:2:0 | stable | uniform |

[1] EtO-PHMS solution [made by using mol ratio of PHMS:EtOH = 1:2, 150 ppm of Ru$_3$(CO)$_{12}$ catalyst, based on polymer];
[2] Stable at room temperature indefinitely, no pressure buildup in a closed container;
[3] Uniform coating strongly bonded to substrate after curing at 250° C. with no cracking.

Coating Formulations Based on EtO-PHMS-OH

Example 105

Preparation coating solutions of 20% EtO-PHMS-OH for transparent coatings (polymer-only coatings). A 20% EtO-PHMS-OH (i.e., 20% of the polymer is substituted with ethoxy groups) solution was diluted to desired concentration such as 33%, 25%, 20%, or 15% (based on the weight of original PHMS polymer) by acetone. In some cases, 2-5% of methyl aniline based on amount of the original PHMS polymer was added to the solution as a hydrolysis-condensation catalyst. The coating can be cured at room or elevated temperatures much faster than the EtO-PHMS-OH while the solutions are much more stable than PHMS-OH.

Examples 106-107

Preparation of filled coatings formulations by using ETO-PHMS-OH solution as a binder. Typical procedures for preparing coating slurries consisting of mixing a filler and polymer as a binder in appropriate weight fraction ratios as shown in the table below. Curing catalyst mixtures consisting of Ti(OBu)$_4$/TEA(triethanol amine) [Ti(OBu)$_4$:TEA:EtOH=1:1:1 (wt %)] or TEA/HOAc [TEA:HOAc=1:1 (mole %)] were used. The amount of the catalyst was 5% (wt %) of the original PHMS polymer for Ti(OBu)$_4$/TEA and 3% for TEA/AcOH. For slurries containing Zn dust only TEA/AcOH was used as a catalyst. Mixtures are ball-milled for about 2 h before use. Specific formulations using 42 wt % PHMS solution are as follows:

|  | Example 106 | Example 107 | Example 108 | Example 109 |
|---|---|---|---|---|
| Filler | $TiO_2$ | $Al_2O_3$ | $SiO_2$ | $Zn/TiO_2$ |
| Weight of filler (g) | 20 | 20 | 15 | 35/5 |
| Weight of EtO-PHMS-OH (g) | 12 | 12 | 12 | 12 |
| Additional ethanol |  |  | 1 |  |

Surface Treatment Prior to Coating

Example 110

Surface preparation. Substrate surface (e.g., metal, ceramics, glass and plastics) should be first cleaned from dirt and soil prior to coating. Typical cleaning practiced by various OEM industries can be used, including rinsing procedures or submerging of substrates in serial cleaning liquids. In the case of corroded surfaces, loose rust must be removed in order to ensure efficient bonding of the coatings to substrates.

Examples 111-117

Metal surface pretreatment. Typical pretreatments of metals can be used such as conversion layer treatments for aluminum alloys and steels (chromating or phosphating of steels). Some simpler surface pretreatments approaches for steel were found to be very sufficient. For example, 3% $NH_4F$ or phosphoric acid (pH2) water solutions may be used to treat (coat or spray on) substrate surfaces before protective coatings are deposited for improving the coating bonding to the substrates. Very good bonding was achieved with the described coating systems when the surfaces were dipped for less than a minute in dilute $HNO_3$ solution (2N $HNO_3$).

| Example # | Reagent | Results |
|---|---|---|
| 111 | 2N $HNO_3$ | The best results among all surface treatment |
| 112 | $H_3PO_4$ (pH 1.7) | Much better than those without surface treatment, but poorer than those treated by 2N $HNO_3$ solution |
| 113 | 3% $H_2O_2$ + $H_3PO_4$ (pH 1.7) | Freshly prepared solution gives about the same results as from 2N $HNO_3$ |
| 114 | $Si(OAc)_4$ 1.5% in EtOH | Much better than those without surface treatment. Results are about the same as those from $H_3PO_4$ (pH 1.7) treatment. |
| 115 | 0.05 N HCl | Better bonding obtained compared with not-treated surface. Results are about the same as those from $H_3PO_4$ (pH 1.7) treatment. |
| 116 | 0.1 N NaOH | No improvement |
| 117 | 2% ATP | Slightly better than those without surface treatment |

From the data gathered, the best bonding was obtained for surfaces treated by 2N $HNO_3$ or $H_2O_2/H_3PO_4$ solution. For example, coatings prepared on steel surfaces treated by 2N $HNO_3$ solution were observed to be stable using the high temperature treatment method of examination described above. Better bonding was obtained for surfaces treated by dilute acids. Bonding was not improved by treating surfaces with bases. The best bonding was obtained by treating surfaces with nitric acids or acidic $H_2O_2$ solution, possibly because of the strong oxidation ability of these solutions (i.e., the ability to form —OH groups on the substrate surface). In addition, treatment of metal surfaces with dilute acids allows positive charging of the hydrated hydroxy groups at the metal surface because the pH of the acid solution is below the isoelectrical point of surface (IEPS). When the charged surface is immersed in a modified PHMS solution (which has a pH of around 7), any Si—$O^-$ groups are attracted to the surface. Absorption of the polymers to the surface increases the possibility of bond formation between —OH group and Si—OH groups, and also reduces self-condensation taking place among Si—OH groups from the polymer chains. Furthermore, protons on the surface act as a condensation catalyst to speed up condensation rate. It was also observed that there was no improvement in polymer-surface bonding by treating substrate surfaces with base solutions, further supporting these observations.

Example 118

Plastic surface pretreatment. Bonding to plastics can be enhanced by a slight surface oxidation achieved by corona discharge, ozone, oxygen plasma etching, rapid thermal heating, or the like. Acid and base treatments may also be useful to enhance the bonding of the preceramic polymers to plastic substrates.

Coating Deposition and Curing Processes

Example 119

Coating deposition. Coatings were deposited by various conventional techniques such as dip, flow roll, air knife, doctor blade, or spray coating depending on application purposes and manufacturing capabilities. Viscosity of slurries can be adjusted to meet requirements for different applications or to adjust the thickness of the coatings by adding suitable solvents including VOC exempt solvent. Thick, graded, and multicompositional coatings can be obtained by multiply coating formulations deposited in a sequence and cured together, provided that the subsequent formulations are deposited without damaging the previous layer. This was demonstrated by either spray coating techniques where the previous layer(s) were let dry prior to subsequent deposition or by drying and semi-cure the previous layer(s) in dip coating operations.

Examples 120-125

Curing by Catalytic Dehydrocoupling Reaction using $Ru_3(CO)_{12}$. The base polymers and partially alcohol-modified polymers containing Si—H bonds can react with water by the dehydrocoupling reaction in the presence of dehydrocoupling catalyst. The dehydrocoupling reaction is affected strongly by the amount and type of catalyst used (such as $Ru_3(CO)_{12}$, the curing temperature, and the solvent. For the original polymers, the rate of reaction increases with the amount of catalyst when the curing temperature is $\leq 150°$ C. When temperatures are in the range of 120 to 150° C. are used, a small amount of catalyst (e.g., 200 ppm) gives satisfactory curing results. Thus, the amount of catalyst can be adjusted according to the curing temperature. Lower temperatures require 300 to 500 ppm to achieve satisfactory curing rates. The table below provides some curing results for the base PHMS polymers. At temperature above 150° C. it is also expected that non-catalyzed reactions such as dehydrocoupling and oxidation in (with $O_2$) will take place, provided that the curing is carried out in air. Therefore, the dehydrocoupling reaction generates the early curing stage, solidifies the coatings, and prevents violent evolution of hydrogen prior to sufficient solidification.

Organometallic platinum compounds are also very active as dehydrocoupling catalysts. Other catalysts are also suitable as described herein.

| Example # | Polymer (Amount of Ru$_3$(CO)$_{12}$) | Before Curing | % of Si—H Bonds Left[1] | | 300° C./ 5 h |
|---|---|---|---|---|---|
| | | | 150° C./7 h | 240° C./14 h | |
| 120 | PHMS (200 ppm) | 100 | 32 | 14 | |
| 121 | PHMS (500 ppm) | 100 | 27 | 12.5 | 8.4 |
| 122 | PHMS (1000 ppm) | 100 | 21 (2 h)[2] | 11 | |
| | | | 20 (14 h)[2] | | |
| 123 | PCHMS (200 ppm) | 100 | 33 | 12 | |
| 124 | PCHMS (500 ppm) | 100 | 30 | 10 | 9.5 |
| 125 | PCHMS (1000 ppm) | 100 | 26 (2 h)[2] | 8 | |
| | | | 22 (14 h)[2] | | |

[1]% of Si—H Bonds left is calculated by integrating peaks of FTIR spectra [area of Si—H/area of Si—CH$_3$] compared to this ratio at the uncured stage (defined as 100% Si—H).
[2]Curing time for polymers.

Example 126

Curing of PHMS based Formulations that still contain significant level of Si—H bonds. Typically, initial curing starts after the solvent is removed at room temperature. The initial curing process is based on catalytic dehydrocoupling of PHMS itself using 100 to 1000 ppm of Ru$_3$(CO)$_{12}$ as the dehydrocoupling catalyst and moisture from ambient atmosphere as the curing agent (the curing agent must have an O—H or N—H functional group in this process). Heating of the coating is required to complete the curing and obtain good adhesion, hardness, and protection. Temperatures from 80° C. to 300° C. can be used for efficient catalytic curing. Sub-pyrolytic temperatures are preferred for curing. The table below summarizes some of the experiments to assess the curing activities of the Ru catalysts in formulations consisting of neat linear (PHMS) and cyclic (PCHMS) polymers consisting of [CH$_3$SiHO] monomeric units.

Examples 127-128

Effect of temperature on curing PHMS polymers with 56% of the Si—H bond replaced by Si—OCH$_3$ bonds. The table below summarizes the effect of temperature on curing (thermal curing only) modified PHMS and modified PCHMS in which 56% of the Si—H bonds were replaced by Si—OCH$_3$ bonds. Moisture was required to hydrolyze the alkoxy groups and/or replace the Si—H bonds.

Example 129

MeO-PCHMS Catalyzed with 500 ppm of Ru$_3$(CO)$_{12}$

| Curing Temperature/ Time | Si—H Bond Disappearance | Si—OMe Bond Status |
|---|---|---|
| 85° C./48 h | ~30% | Small amount hydrolyzed |
| 200° C./6 h | >70% | Some hydrolyzed |
| 200° C./24 h | >70% | Some hydrolyzed |
| 300° C./16 h | >95& | Most hydrolyzed |

Example 130

MeO-PHMS Catalyzed with 500 ppm of Ru$_3$(CO)$_{12}$

| Curing Temperature/ Time | Si—H Bond Disappearance | Si—OMe Bond Status |
|---|---|---|
| 85° C./48 h | ~50% | Small amount hydrolyzed |
| 200° C./6 h | >80% | Some hydrolyzed |
| 200° C./24 h | >80% | Some hydrolyzed |
| 300° C./16 h | 100% | Most hydrolyzed |

Example 131

Curing by Hydrosilylation and Combination of Hydrosilylation/Dehydrocoupling. PHMS and modified polymers with significant content of Si—H bonds (more than 5 mol %) can be cured by multyvinyl reagents in the presence of hydrosilylation catalysts, most effectively Pt compounds. The presence of 3 to 5 mole % of vinyl in such compounds is sufficient for curing. Goodcatalysts are Pt based compounds that are soluble in solvents compatible with PHMS, especially Pt compounds with vinylsilane ligands.

Example 132

Acid Catalyzed Hydrolysis-Condensation Reactions. Modified polymers containing alkoxy or hydroxy groups (e.g., PHMS wherein a portion of the SI—H bonds have been converted to Si—OR and/or Si—OH) are catalytically cured by hydrolysis-condensation mechanisms. Acids and bases have been known as catalysts for hydrolysis and condensation reactions of alkoxy silanes for many years. Strong acids such as sulfuric and sulfonic, which dissolve readily in solvent, are efficient catalysts. Phosphoric and phosphonic acids are also suitable because their inorganic core can participate in the cured material structure as well as adding corrosion inhibition. When strong acids are added to coating solutions, the Ru catalyst loses its catalytic ability and the stability of the coating slurries are decreased. Sulfonic acids can also attack the cured polymer backbone. Acetic acid and its salts were found to be efficient catalysts, including catalysts combining alkoxy-titanates with acidic acid. Phosphoric acid was also found to be effective. Typical amount of catalyst is, for example, 0.5 to 4.0 wt %. Acid catalyzed hydrolysis of alkoxy groups requires typically heating above 100° C. and preferably above 150° C. to be efficient. Condensation reactions are faster but still require heating to be sufficient in the presence of acid catalysts. Alkoxy and carboxy compounds of Ti, Zr, Zn and Sn, and their salts, can also serve as condensation catalyst for Si—OH.

Example 133

Base-Catalyzed curing. Organic bases were found to be much more efficient catalysts for condensation of Si—OH containing modified polymers than the above acidic and organometallic catalysts. They can be very efficient in their curing capability even at room temperature and in many cases they allow better pot life and wider operation window.

Example 134

Strategies for adding curing catalysts. Catalysts are added to the coating slurry or applied to the coating surface prior to coating deposition by dipping or spraying. The curing rates of coatings are controlled by the amount of catalyst; coatings can be cured at room temperature with sufficient catalyst.

Examples 135-141

Curing of PHMS-OH with condensation catalysts. Effective catalysts used for the condensation reaction (curing) of PHMS-OH are acid and bases. Amine and polyamine compounds and their acid/base salts were found to be very efficient catalysts. Amino siloxanes and aminoalkoxy silanes were also very efficient catalysts. The comparative evaluation of several types of catalysts is shown in the table below. The experiment results show, for example, that triethanol amine is a good catalyst candidate. Derivatives of triethanol amine and other compounds further improved the condensation efficiency combined with the shelf stability of coating solutions and slurries.

| Example # | Catalyst (1 wt % based on polymer) | Results (using 20 to 30% PHMS-OH solution) |
|---|---|---|
| 135 | NaF or NH$_4$F ethanol solution | Not an effective catalyst at room temperature, but very effective at >85° C.; Unstable coating solutions (i.e., rapidly gels), especially when water is presence. |
| 136 | Diamine siloxane | Very effective catalyst, but unstable coating solutions; Can be used efficiently with short periods between mixing and depositions or if the operating solution is cooled down. |
| 137 | 30% aminopropyl-PHMS-OH in ethanol | Very effective catalyst, unstable coating solutions; see comment above. |
| 138 | polyamide | Very effective catalyst, unstable coating solutions; see comment above. |
| 139 | Triethanol amine (TEA) | Very effective catalyst, unstable coating solutions, but better than other kinds of amines. |
| 140 | TEA/HOAc (1/1 mole ratio) | Very effective catalyst, unstable coating solutions, but better than TEA. |
| 141 | Ti(OBu)4/TEA (1/1 weight ratio) | Very effective catalyst, unstable coating solutions, but better than TEA. |

Examples 142-144

The curing extent of clear PHMS-OH coatings at room temperature by using TEA followed by FT-IR. Coatings of PHMS-OH deposited from a 20 to 30% ethanol/water solution were deposited on silicon wafer and cured at room temperature unless otherwise indicated in the table below. The curing extent was followed by FT-IR by comparing the relative intensity of the two peaks at 3600-3030 cm$^{-1}$ detecting the OH groups and at 1320-1230 cm$^{-1}$ detecting the Si-Me groups.

| | Curing Extent (% of Si—OH condensation) | | |
|---|---|---|---|
| Time | Example 142 (no catalyst; control) | Example 143 (1 drop TEA in 16 g of PHMS-OH) | Example 144 (3 drops TEA in 16 g of PHMS-OH) |
| 10 min | 0 | 11 | 11 |
| 2 h | 3.5 | NA | 34 |
| 4 h | 5.55 | NA | 35 |
| 20 h | 18 | 41.5 | 51.5 |
| 48 h | 22 | NA | 51 |
| 72 h | 22 | 46 | 59.1 |
| 4 days | NA | 48.5 | NA |
| 5 days | 22 | 48 | 56 |
| 6 days | 22 | 52 | 56 |
| 7 days | 22.6 | NA | 58.8 |
| 90° C., 3 h | NA | NA | 68.6 (no coating cracking) |
| 120° C. 2 h | NA | NA | 82.4 (cracking) |
| 150° C. 2 h | Na | NA | 100 |
| Stability of solution at RT | 15 days | 1.5 day | 1 day |

Examples 145-148

Curing conditions for coatings using EtO-PHMS-OH polymer. In contrast to PHMS-OH polymer, solutions of EtO-PHMS-OH are much more stable and cure very slowly at room temperature due to the presence of Si—OEt groups on the polymer chains. The curing process can be accelerated, for example, by adding condensation or hydrolysis-condensation catalysts. Generally, bases, acids and some compounds such as fluoride salt are effective catalysts for the condensation reaction. Coatings can be cured at room temperature in the presence of an amine catalyst and moist air. Coatings become touchable in about 1 hour. Subsequent coating layers can be deposited over the previous layers after one day of curing. Full curing of the coatings is completed at room temperature after a few days. Coatings can also be cured at elevated temperature (>100° C.) without catalysts within 6 hours.

Coatings made of 20% EtO-PHMS-OH deposited from a 20 to 30% ethanol/water solution were prepared on silicon wafer and cured at room temperature unless otherwise indicated in the table below. The curing extent was followed by FT-IR by comparing the relative intensity of the two peaks at 3600-3030 cm$^{-1}$ detecting the OH groups and at 1320-1230 cm$^{-1}$ detecting the Si-Me groups.

| Time | Example 145 (no catalyst; control) | Example 146 (2 drops of TEA in 12 g of 42% polymer solution) | Example 147 (6 drops of 1 g Ti(BuO)4/1 g TEA/1 g EtOH in 12 g EtO-PHMS-OH solution) | Example 148 (4 drops of 1 mol TEA/1 mol HOAc in 12 g EtO-PHMS-OH solution) |
|---|---|---|---|---|
| 10 min | 0 | 12.5 | NA | NA |
| 1 day | 0 | NA | 38 | 39 |
| 2 days | 0 | NA | 42 | 45 |
| 3 days | 0 | 50 | NA | NA |
| 4 days | NA | 52 | NA | NA |
| 5 days | NA | 55 | NA | NA |
| 1 h at 110° C. | 58 | NA | NA | NA |
| 2.5 h at 110° C. | 63 | NA | NA | NA |
| 0.5 h at 130° C. | 66 | NA | NA | NA |
| 130° C. overnight | 82 | NA | NA | NA |
| Stability of solution at RT | 20 days | 1.5 day | 3 days | 3 days |

Curing Extent (% of Si—OH condensation)

The results reveal that the curing extent at room temperature is affected by (1) the amount of catalyst, (2) the curing time and (3) the temperature. Because the catalyst reduces the stability of coating systems the amount of catalyst used in such formulations is controlled to give a reasonable curing rate and at the same time a reasonable pot life to allow a processing window. Preferably, catalyst is added to the coating formulation just prior to application, unless the catalyst is inhibited by blocking (such as acid/base salts).

Higher stability of solutions or slurries containing TEA/Ti(OBu)$_4$ as a catalyst can be attributed to coordination reactions happening between TEA and Ti$^{4+}$, which will reduces or eliminates catalytic properties from the amine. TEA-Ti(OR) compounds act as condensation catalysts. The release of the amine when the metal complex is hydrolyzed or decomposed after being exposed to moisture activates the catalyst. For TEA/HOAc, the catalytic effect is generated by the acetate anions because ammonium groups do not have good catalytic properties by themselves as found in the case of trimethylamine hydrochloride.

Examples 149-152

Curing of Coating formulations based on RO-PHMS-OH and R-PHMS-OH in the presence of a base catalyst (Desmorapid). The following examples are experiments of curing various coatings that are 20 to 30 μm thick based on various modified PHMS-OH polymers in the presence of a commercial base catalyst (DESMORAPID®, available from Bayer—a mixture of condensed oligo-propylene amine, used for curing polyurethanes). The curing was performed at room temperature. In the absence of the catalyst, the coatings are still soft after 24 h, and never reach the maximum hardness.

Example 149

5% Styryl-15% Benzyloxy-PHMS-OH

| DESMORAPID ®, % | Dry-To-Touch | Dry-Hard | Dry-Through |
|---|---|---|---|
| 0.5 | ~2.5 h | ~3.0 h | ~4.0 h |
| 1 | ~2.0 h | ~2.0 h | ~2.5 h |
| 2 | ~1.5 h | ~1.5 h | ~2.5 h |

Example 150

10% Styryl-10% Benzyloxy-PHMS-OH

| DESMORAPID ®, % | Dry-To-Touch | Dry-Hard | Dry-Through |
|---|---|---|---|
| 0.5 | ~2.5 h | ~3.0 h | ~4.0 h |
| 1 | ~2.5 h | ~3.0 h | ~3.0 h |
| 2 | ~1.0 h | ~1.5 h | ~2.5 h |

Example 151

5% Styryl-15% Ethoxy-PHMS-OH

| DESMORAPID ®, % | Dry-To-Touch | Dry-Hard | Dry-Through |
|---|---|---|---|
| 0.5 | ~45 min | ~60 min | ~60 min |
| 1 | ~45 min | ~60 min | ~60 min |
| 2 | ~45 min | ~60 min | ~60 min |

Example 152

10% Styryl-10% Ethoxy-PHMS-OH

| DESMORAPID ®, % | Dry-To-Touch | Dry-Hard | Dry-Through |
|---|---|---|---|
| 0.5 | pot life too short (30 min) | — | — |

Examples 153-161

Coating dry time (i.e., solvent removal plus early gelation stage). Various coatings, prepared according to the disclosure, were applied to a substrate and dried/cured at room temperature (RT) in the presence of 1% base catalyst. The results are provided in the table below. Dry times of coatings at RT can be faster in the presence of higher levels of catalyst or within the conventional time frames of organic coatings.

| Example # | Coating | Substrate | Surface Treatment | Drying Time - Observations |
|---|---|---|---|---|
| 153 | 20% EtO-PHMS-OH | Steel | Yes | 10 min. - Not dry to touch<br>15 min. - Dry to touch, not tack free<br>46 min. - Tack free, not dry through<br>1 h - Dry through |
| 154 | 20% EtO-PHMS-OH | Aluminum | Yes | 18 min. - Not dry to touch<br>23 min. - Dry to touch, not tack free<br>46 min. - Tack free, not dry through<br>70 min. - Dry through |
| 155 | 20% EtO-PHMS-OH | Steel | No | 10 min. - Not dry to touch<br>25 min. - Dry to touch, not tack free<br>67 min. - Tack free, not dry through<br>88 min. - Dry through |
| 156 | 20% EtO-PHMS-OH | Aluminum | No | 12 min. - Not dry to touch<br>23 min. - Dry to touch, not tack free<br>65 min. - Tack free, not dry through<br>82 min. - Dry through |
| 157 | $SiO_2$/EtO-PHMS-OH (2.5:1) | Steel | No | 17 min. - Tack free, not dry through<br>1 h - Dry through |
| 158 | $SiO_2$/EtO-PHMS-OH (2.5:1) | Aluminum | No | 17 min. - Tack free, not dry through<br>1 h - Dry through |
| 159 | $TiO_2$/PHMS-OH (5:1) | Steel | Yes | 19 min. - Tack free, not dry through<br>45 min. - Dry through |
| 160 | $TiO_2$/PHMS-OH (5:1) | Steel | No | 22 min. - Tack free, not dry through<br>48 min. - Dry through |
| 161 | $TiO_2$/PHMS-OH (5:1) | Aluminum | No | 25 min. - Tack free, not dry through<br>50 min. - Dry through |

Example 162

Curing conditions for transparent coatings based on PHMS-OH. When no catalyst is used, coatings can be first cured at 85-90° C. in air for 4 h, then in 3% $NH_4F$ water solution at 60° C. for another 4 h. The coatings soon become hard enough to touch at 85-90° C. and reach enough crosslinking density to ensure hardness and solvent resistance after further curing in $NH_4F$ water solution. When an amine is used as a catalyst, the coating can be cured at 85-90° C. in 24 h or less.

Example 163

Curing conditions slurry formulations (filled systems) used for corrosion protection coatings. Filled coatings can be cured at room temperature when PHMS-OH is used as a binder and a condensation catalyst such as DESMORAPID®. Coatings become touchable within 30 min when an amine catalyst is used. Second coatings can be applied over the first coating, for example, after curing for 10 hours at RT. Full curing takes several days to complete at room temperature. When water/ethanol is used as cosolvent, curing proceeds slower and a longer time (e.g., one day) is needed before the second coating can be applied.

Example 164

Curing conditions for high temperature resistant coatings. Coating can be cured at 150° C. for two hours before a second coating layer is deposited. These coating can endure high temperature (>350° C.) without cracking and peeling if surfaces of substrates are well treated to provide good bonding between coating and substrates.

Example 165

Curing conditions for coatings based on PHMS-OR. The polymer can be cured slowly at room temperature by the hydrolysis reaction between Si—OR with water to form first Si—OH followed by the condensation reaction between Si—OH in presence of catalysts. Suitable catalysts include transitional metal organic compounds, bases and acids. Curing at high temperature will accelerate the curing process. When high temperature (>200° C.) is feasible for the curing process, no catalyst is needed. Curing catalysts include strong acids such as sulfuric acid or sulfonic acid or $Ti(OR)_4$/$NH_4F$ formulations, organic bases and their salts and organic acids. Coatings were cured at 80-90° C. to accelerate the process. By using $Ti(OR)_4$ as a catalyst, the refraction index of the coating can be adjusted by introducing varied percentage of Ti compound which also adds to the curing system.

Example 166

Curing conditions for slurries. Strong acids were not as effective as catalysts for slurry based coatings because of the presence of fillers. However, $Ti(OR)_4/NH_4F$ and several base catalysts remained effective for curing such slurry based paints. Room temperature curable coatings can be achieved by using 3-5% wt % of $Ti(OR)_4$ or 0.5 to 2 wt % of base catalyst. Coatings become touchable after one to two hours at RT and a subsequent coating layer can be deposited overnight.

Example 167

Control of crosslinking extent by reducing reactive sites. Control of crosslinking extent (or crosslinking density) allows preparation of coatings with desirable qualities. Coatings with a crosslinking density that is too low may be soft and have poor chemical, solvent and corrosion resistance. When crosslinking density is too high, coatings become brittle and have poor flexibility. Cracks are frequently observed as a result.

Several ways can be used to reduce or otherwise control crosslinking density. First, reactive groups can be reduced in number by replacing some Si—H with Si—R groups. Second, curing conditions can be controlled by allowing certain active groups to crosslink while making others unreactive. Third, curing extent can be controlled by allowing only part of the active groups to react with each other. All these methods are discussed in detail below.

In the first method of controlling crosslinking density, the number of potentially reactive groups is reduced in polymer chains. For example, when some Si—H groups are replaced by Si-Me groups, a copolymer of PHMS and PDMS (i.e., polydimethylsiloxane) is obtained. Two commercially available copolymers of PHMS and PDMS with 35-545% Si—H and 40-55% Si—H respectively were modified by water to form PHMS-OH and PDMS copolymers. Coatings were prepared from the modified polymers to compare with PHMS-OH polymer. It was found that the curing rate of the copolymers is much slower than the curing rate of PHMS-OH. Thin films prepared from the copolymers are more flexible and soft, and can endure high temperature without cracking. Coating could not be cured at room temperature even by using higher amount of catalyst.

Example 168

Reducing crosslinking activity by alkoxy group substituents. In the second method of controlling crosslinking density, curing conditions are controlled by allowing certain kinds of active groups to crosslink while keeping others unreacted. RO-PHMS-OH polymer is used as an example, as it contains two kinds of potentially reactive groups. The —OH groups are very active and can be cured in mild conditions. The —OR groups are relatively stable and need more severe conditions to cure. By controlling curing conditions to allow only —OH group to crosslink while keeping —OR groups unreacted, crosslinking density can be controlled. Furthermore, the number of Si—OR groups can be controlled during the modification reaction. Selectively curing the RO-PHMS-OH polymer was achieved using temperature control. By curing the coatings at 100-150° C., only Si—OH groups quickly crosslink while Si—OR groups remain unreacted. The use of a mild condensation reaction catalyst is also able to achieve selective curing. It was found that only small amount of triethanol amine (1-2% based on weight of PHMS) is very effective for condensation reaction of Si—OH groups at room temperature. However, this amount of catalyst shows hardly any catalytic effect for Si—OR even at 100° C. By using selected curing technologies, crosslinking density can be conveniently controlled. Coatings obtained from RO-PHMS-OH polymers show more flexibility, high thickness (~20 um) and can endure higher temperature (100-150° C.) without cracking.

Example 169

Control of crosslinking by selective partial reactivity. In the third method of controlling crosslinking density, only a portion of the active groups are allowed to react with each other. For example, when PHMS-OH polymer is heated at 100-120° C. for a short time such as 20-30 min, only part of Si—OH group react and part remain unreacted. Coating can still reach enough hardness when crosslinking density is controlled in this way, and cracking can be avoided. Another example involves quickly placing coatings in a furnace at about 300° C. To avoid over-crosslinking, the coatings are pulled out almost immediately. By repeating this method several times, surface Si—OH groups quickly condense, which results in a smooth, hard surface. Some Si—OH groups inside the coating layer remain unreacted, which provides enough flexibility to prevent cracking.

The second and third methods for controlling crosslinking density described above allow some potentially reactive groups such as Si—OR groups to remain inside the coatings. When suitable conditions are created (such as, in some cases, high temperature or exposure to strong acids or bases), these active groups may further react and crosslink, thereby increasing the crosslinking density.

Performance of Coatings

Examples 170-172

Salt spray testing of filled paints deposited on cold rolled steel, chemically washed. In general, thick (>50 μm) filled coatings prepared based on selected slurry formulations and thin (<10 μm) clear coatings based on polymer solutions prepared as described in the previous examples can be stable up to 400° C. in their cured preceramic (organic-inorganic) stage, well beyond any organic paints. When subjected to extreme temperatures, the coatings are not burnt (oxidized to $CO_2$ and $H_2O$) but converted to a ceramic or ceramet coatings. Some formulations remain intact on industrial metals that face temperatures up to 800° C. No catastrophic failure of coatings was observed in the presence of fire. PHMS-derived polymers can be modified as fire-retardant additives to organic polymers—an important safety aspect for many chemical companies.

Coatings of various compositions were prepared and applied to surface-treated cold rolled steel substrates. The table below shows salt-spray test results from subjecting these coatings to standard salt-fog test.

| Example # | Coating (powder to polymer weight ratio) | Layers (Thickness) | Cure Temp. | Salt Spray Time (h) | Results |
|---|---|---|---|---|---|
| 170 | SiO$_2$/EtO-PHMS-OH (3:1) | 3 (~100 μm) | 110° C. | 1100 | No degradation of coatings<br>No delamination of coating<br>No Blisters<br>No scribe receding |

-continued

| Example # | Coating (powder to polymer weight ratio) | Layers (Thickness) | Cure Temp. | Salt Spray Time (h) | Results |
|---|---|---|---|---|---|
| 171 | Zn/SiO$_2$/EtO-PHMS-OH (7:1) | 3 (~100 μm) | 110° C. | 1100 | No degradation of coatings<br>No delamination of coating<br>No Blisters<br>No scribe receding |
| 172 | TiO$_2$/EtO-PHMS-OH (4:1) | 3 (~100 μm) | 110° C. | 770 | No degradation of coatings<br>No delamination of coating<br>No Blisters<br>No scribe receding |

Examples 173-181

Chemical stability of coatings. Various PHMS derived polymers were prepared according to the disclosure. The table below provides chemical stability data for the PHMS derivatives. For comparison, the table also provides chemical stability data for a polyurethane high performance commercial paint. All the coatings were cured at room temperature using base condensation catalyst. The filler amount was 17 vol % TiO$_2$ in the cases where it was present. No corrosion resistance fillers and additives were added, although such fillers would improve coating performance. With the exception of stability in strong base solutions (above pH12), the chemical resistance of the PHMS derived polymer formulations provided very high chemical stability with chemical reagents known to severely damage organic-based coatings. In some cases, small variations in the formulations of PHMS provided significant effects on chemical stability. As shown in the table, the chemical stability of the coatings demonstrated their capability to provide excellent performance for many industrial environments.

The coatings were exposed to the chemicals by depositing a standard amount of the liquid or solution and covering it with a glass container to prevent evaporation. In some cases, it was necessary to add more of the liquid due to its evaporation. The standard test called for 14 h exposure, but some of the formulations were tested for longer periods to further assess their capability in comparison with polyurethanes.

| Example # | Paint's polymer/PHMS modifier (mol % of monomeric units) | TiO$_2$ filler | MEK | Toluene | EtOH | 10% H$_2$SO$_4$ | 10% NaOH |
|---|---|---|---|---|---|---|---|
| 173 | High performance polyurethane paint | yes | 1 h | 4 h OK<br>14 h fail | 1 h | 3.5 h | 14 h |
| 174 | 10% MeOEtO | yes | 2 min | >14 h | 14 min | >14 h | 0.5 h |
| 175 | 10% cycHexO | No | 10 min | >14 h | 6 min | >14 h | 0.5 h |
| 176 | 10% cycHexO | yes | 2 h | >14 h | 5 min | >14 h | 0.5 h |
| 177 | 10% t-BuO | yes | 1.5 h | >14 h | >14 h | >14 h | 0.5 h |
| 178 | 5% Octyl | No | >15 h | >15 h | >15 h | >6 h | 1 h |
| 179 | 5% Octyl | yes | >15 h | >15 h | >15 h | >6 h | 0.5 h |
| 1580 | 5% Octyl/15% t-BuO | No | >17 h | >15 h | >18 h | >3 h | >3 h |
| 181 | 5% Octyl/15% t-BuO | yes | >17 h | >15 h | >18 h | >3 h | 2.5 h |

Examples 182-189

High temperature performance of filled formulations with PHMS polymer as a binder. Coatings based on slurries consisting of PHMS (1 part), Al flakes (1 part) and Al$_2$O$_3$ fine powder (1 part) and 500 ppm of Ru$_3$(CO)$_{12}$—were applied to various substrates and subjected to elevated temperature for a predetermined period of time. Bonding of the coating to the substrate was highly dependent on the surface elemental content. The mismatch in coefficient of thermal expansion (CTE) was not critical. The best bonding occurred with aluminum and iron based surfaces. The results are summarized in the table below. Similar coating formulations have survived temperatures of 1300° C., when deposited over silicon nitride, silicon carbide and ceramic composite materials.

| | | Temperature/Time | | | | | |
|---|---|---|---|---|---|---|---|
| Example # | Substrate (CTE; ×10$^{-6}$ K$^{-1}$) | 150° C., 2 h | 300° C., 12 h | 400° C., 12 h | 500° C., 12 h | 600° C., 12 h | 700° C., 12 h |
| 182 | Pyrex (3.3) | Cracked | N/A | N/A | N/A | N/A | N/A |
| 183 | Glass (8) | OK | OK | OK | OK | glass deformed | glass melted |

-continued

| Example # | Substrate (CTE; ×10⁻⁶ K⁻¹) | 150° C., 2 h | 300° C., 12 h | 400° C., 12 h | 500° C., 12 h | 600° C., 12 h | 700° C., 12 h |
|---|---|---|---|---|---|---|---|
| 184 | Carbon Steel (11) | OK | OK | OK | OK | OK | Peeled |
| 185 | Cast Iron (12) | OK | OK | OK | OK | OK | OK |
| 186 | Stainless Steel (16-18) | OK | OK | OK | OK | OK | OK |
| 187 | Copper (17) | OK | OK | OK | Peeled | N/A | N/A |
| 188 | Brass (19-20) | OK | OK | OK | OK | Peeled | N/A |
| 189 | Aluminum (23.5) | OK | OK | OK | OK | OK | Al melts |

Examples 190-200

Additional evaluation of clear and filled PHMS-derived coatings. Clear and filled coatings were prepared with various modifications of PHMS, powders, and curing conditions, as described in the tables below. Performance data for these coatings compared with manufacturer-provided performance data for undisclosed but commercially available high-performing paints are provided in the tables below. Some advantageous characteristics of the preceramic coatings developed under the described conditions are: hardness, inorganic acid resistance, and no blistering, minimum receding of scribe width, no softening during salts pray tests.

Salt spray tests were performed and evaluated according to the following ASTM methods: Salt spray tests: Blistering—ASTM D714 (highest score—10); General rust—ASTM D610 (highest score—10); Scribe failure—ASTM D1654 (highest score—10); Pencil hardness test [highest score is 9H down to H and then B and down to 6B (lowest)]; Tape adhesion test (highest score—5B). The tables demonstrate that selected properties are varied and depended on both the overall formulation and curing process. Therefore, it can be claimed that the chemical reactions evolved between polymers and powder particles and between polymers and the substrates have a significant role aside the polymer composition and the content/type of powder filler.

| | PHMS-derived coating | | | | | |
|---|---|---|---|---|---|---|
| | Example 190 Clear 1 | Example 191 Clear 2 | Example 192 Clear 3 | Example 193 Clear 4 | Example 194 Filled TiO₂ | Example 195 Filled SiO₂ |
| Preceramic polymer type | EtO-PHMS-OH | EtO-PHMS-OH | EtO-PHMS-OH | PHMS-OH | EtO-PHMS-OH | EtO-PHMS-OH |
| Cure Temperature/Time | 110° C., 15 h | 110° C., 15 h | RT, 2 wks | 80° C., 15 h | 110° C., 15 h | 110° C., 15 h |
| Surface Treatment | None | HNO₃ | HNO₃ | HNO₃ | HNO₃ | HNO₃ |
| Micrometer Film Thickness, mils | 0.53 | 0.52 | 0.24 | 0.39 | 2.55 (1 coat, 0.85 mil) | 6.5 |
| Pencil Hardness | 4H | 5H | 7H | 6H | 9H | 5H |
| Tape Adhesion | 5B | 5B | 5B | 5B | 4B | 4B |
| Direct Impact, inch-pounds | | >168 | | | 12 to 16 | <40 |
| Reverse Impact, inch-pounds | 36 | 32 to 36 | | | <4 | <4 |

| Chemical Resistance | | | | | | |
|---|---|---|---|---|---|---|
| | PHMS-derived coating | | | | | |
| | Example 190 Clear 1 | Example 191 Clear 2 | Example 192 Clear 3 | Example 193 Clear 4 | Example 194 Filled TiO₂ | Example 195 Filled SiO₂ |
| 10% H₂SO₄ | Pass | 3 small spots delam, 72 h | 3 mm spot gone, 72 h | Gone, 72 h | Pass | Pass |

-continued

| Chemical Resistance | | | | | | |
|---|---|---|---|---|---|---|
| | PHMS-derived coating | | | | | |
| | Example 190 Clear 1 | Example 191 Clear 2 | Example 192 Clear 3 | Example 193 Clear 4 | Example 194 Filled $TiO_2$ | Example 195 Filled $SiO_2$ |
| Conc. $H_2SO_4$ | Gone, 6 h | Gone 6 h | Gone, 6 h | Gone, 6 h | Gone, 6 h | Gone, 6 h |
| 10% HCl | Gone, 24 h | Gone, 72 h | Delam, Disc, Bust, Corr, 72 h | Gone, Corr, 72 h | Crack, 24 h | Crack/Discolor, 72 h |
| Conc. HCl | Gone, 6 h | Gone, 6 h | Gone, 6 h | Gone, 6 h | Gone, 6 h | Gone, 6 h |
| 10% $H_3PO_4$ | Blister/Delam., 72 h | Pass | Pass | Small Spot Gone, 72 h | Crack, 72 h | Pass |
| Conc. $H_3PO_4$ | Pass | Pass | Pass | Pass | Pass | Pass |
| 10% $CH_3COOH$ | Discolor, Blister Corr, 6 h | Corrosion, 6 h/Gone, 24 h | Discolor, 6 h/Corr, 24 h | Discolor, 6 h/Corr, Cr, Blist, 24 h | Crack, 72 h | Corrosion, 24 h/Delam, 72 h |
| Conc. $CH_3COOH$ | Gone, 6 h | Gone, 24 h | Delam, Disc, Blist, Corr, 6 h | Corr, Crack, Blist. 24 h | Pass | Discolor, 6 h/Crack, 24 h |
| 10% $HNO_3$ | F, 6 h | Corrosion, 6 h | Disc, Blist, Corr, 72 h | Crack & Corrode, 72 h | Pass | Pass |
| Conc. $HNO_3$ | Gone, 6 h | Gone, 6 h | Gone, 6 h | Gone, 6 h | Crack, Delam, Corr 6 h | Gone, 6 h |
| 10% NaOH | Gone, 6 h | Gone, 6 h | Gone, 6 h | Gone, 6 h | Gone, 6 h | Gone, 6 h |
| 50% NaOH | Gone, 6 h | Gone, 6 h | Gone, 6 h | Gone, 6 h | Almost Gone, 6 h/Gone, 24 h | Gone, 6 h |
| 10% $NH_4OH$ | Gone, 6 h | Gone, 6 h | Slight Corrosion, 72 h | Pass | Dissolving, 6 h/Gone, 24 h | Nearly Gone, 6 h |
| Mineral Spirits | Pass | Pass | Pass | Pass | Pass | Pass |
| MIBK | Pass | Pass | Pass | Pass | Pass | Pass |
| Toluene | Pass | Pass | Pass | Pass | Pass | Pass |
| Ethanol | Pass | Pass | Pass | Pass | Pass | Pass |

| Salt Spray Corrosion Test | | | | | | |
|---|---|---|---|---|---|---|
| | PHMS-derived coating | | | | | |
| | Example 190 Clear 1 | Example 191 Clear 2 | Example 192 Clear 3 | Example 193 Clear 4 | Example 194 Filled $TiO_2$ | Example 195 Filled $SiO_2$ |
| Blistering, tested 336 h | 10, 1 cycle | 10, 1 cycle | 10, 1 cycle | 10, 1 cycle | 10, 1 cycle | 10, 1 cycle |
| General Rust, tested 336 h | 3-4, 1 cycle | 10, 1 cycle | 0, 3-4, 1 cycle | 0, 6, 1 cycle | 2-4, 4, 1 cycle | 10, 1 cycle |
| Scribe, tested 336 h | 5, 1 cycle | 7-8, 1 cycle | 6-7, 1 cycle | 6-7, 1 cycle | 7, 7-8, 1 cycle | 7, 7-8, 1 cycle |

| Compared Commercial Paints | | | | | |
|---|---|---|---|---|---|
| | Example 196 Commercial A | Example 197 Commercial B | Example 198 Commercial C | Example 199 Commercial D | Example 200 Commercial E |
| Cure (RT) Surface Treatment | 2 weeks plus None | 2 weeks plus None | 2 weeks plus None | 2 weeks plus None | 2 weeks plus None |
| Micrometer Film Thickness, mils | 2.98 | 1.72 | 6.71 | 5.58 | — |

-continued

Compared Commercial Paints

| | Example 196 Commercial A | Example 197 Commercial B | Example 198 Commercial C | Example 199 Commercial D | Example 200 Commercial E |
|---|---|---|---|---|---|
| Pencil Hardness | H-2H | H-2H | 4H | 6H | H |
| Tape Adhesion | 4B | 4B | 4B | 2B-3B | 2B-4B |
| Direct Impact, inch-pounds | 52 | 136 | 20 | 16 | 48 |
| Reverse Impact, inch-pounds | 4 | 44 | <4 | <4 | <4 |

Chemical Resistance

Compared Commercial Paints

| | Example 196 Commercial A | Example 197 Commercial B | Example 198 Commercial C | Example 199 Commercial D | Example 200 Commercial E |
|---|---|---|---|---|---|
| 10% $H_2SO_4$ | Pass | Pass | Slight Discolor, 72 h | Pass | Pass |
| Conc. $H_2SO_4$ | Gone, 6 h | Gone, 6 h | Delam, Disc, Blist, Corr, 6 h | Delam, Disc, Blist, Corr, 6 h | Disc, Blist, Corr 6 h |
| 10% HCl | Pass | Flim slightly dulled, 72H | Slight Discolor, 72H | Slight Discolor, 72H | Slight Discolor, Soften, 72H |
| Conc. HCl | Discolor, 6 h | Delam, Blist, Corr, 6 h | Discolor, 24 h | Discolor, 6 h | Soften, 24 h/Delam, Blist, 72 h |
| 10% $H_3PO_4$ | Pass | Pass | Slight Discolor, 72H | Pass | CK |
| Conc. $H_3PO_4$ | Discolor, 6 h | Delam, Blist, 6 h | Discolor, 6 h | Discolor, Soften, 24 h | Pass |
| 10% $CH_3COOH$ | Blister, 72 h | Blister, 24 h | Slight Soften, 24 h/ Blist, Soften, 72 h | Soften, 24 h/ Discolor, 72 h | Soften, Blister, 72 h |
| Conc. $CH_3COOH$ | Delam, Blist, Corr, 6 h | Delam, Blist, Corr 6 h | Delam, Blist, Soften, 24 h | Soften, 24 h | Delam, Disc, Blist, Corr, 6 h |
| 10% $HNO_3$ | Pass | Blister, Soften, 72 h | Slight Discolor, 6 h | Slight Discolor, 6 h | Pass |
| Conc. $HNO_3$ | Delam, Corr, 6 h | Delam, Blist, Disc, 6 h | Delam, Disc, Blist, Corr 6 h | Delam, Disc, Blist, Corr, 6 h | Delam, Disc, Blist, Corr, 6 h |
| 10% NaOH | Pass | Dulled, 72 h | Pass | Discolor, 6 h | Discolor, 24 h |
| 50% NaOH | Pass | Pass | Pass | Slight Discolor, 72 h | Discolor, 24 h |
| 10% $NH_4OH$ | Slight Discolor, 72 h | Pass | Pass | Discolor, 24 h | Discolor, 24 h |
| Mineral Spirits | Pass | Pass | Pass | Pass | Pass |
| MIBK | Soften, 24 h/Blist, Delam, 72 h | Pass | Pass | Soften, 24 h | Soften, Delam, 6 h |
| Toluene | Delam, Blister, 24H | Slight Soften, 24 h | Pass | Soften, 24 h | Soften, 6 h |
| Ethanol | Soften, 24 h/Blist, Delam, 72 h | Blister, 6 h | Pass | Soften, 24 h | Soften, 6 h |

Salt Spray Corrosion Test

Compared Commercial Paints

| | Example 196 Commercial A | Example 197 Commercial B | Example 198 Commercial C | Example 199 Commercial D | Example 200 Commercial E |
|---|---|---|---|---|---|
| Blister, 336 h | 10, 1 cycle | SMD, 1 cycle | 10, 1 cycle | 10, 1 cycle | 10, 1 cycle |
| General Rust, 336 h | 10, 1 cycle | 10, 1 cycle | 10, 1 cycle | 10, 1 cycle | 10, 1 cycle |
| Scribe, 336 | 5, 5-6, 1 cycle | 7, 1 cycle | 6, 7, 1 cycle | 3-4, 1 cycle | 5, 1 cycle |

What is claimed is:

1. A method for coating a substrate surface, the method comprising:
   (a) applying to the substrate a coating formulation comprising:
      (i) a silicon-containing polymer prepared by the reaction of:
         (1) a precursor polymer comprising units having the structural formula (I)

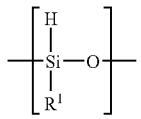

(I)

wherein $R^1$ is $C_1$-$C_{30}$ hydrocarbyl which is optionally substituted and is optionally heteroatom containing, and optionally comprising units having the structure of formula (II)

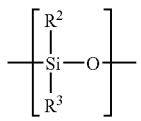

(II)

wherein each $R^2$ and $R^3$ is independently selected from H, $C_1$-$C_{30}$ hydrocarbyl, organometallic, halocarbyl, and organosilyl, each of which is optionally substituted and is optionally heteroatom-containing; with
         (2) a second reagent selected from $H_2O$, an alcohol having the structure $R^{10}OH$, a mixture of alcohols each having the structure $R^{10}OH$, and combinations thereof, wherein each $R^{10}$ is independently selected from hydrocarbyl, halocarbyl, organometallic, and organosilyl, each of which is optionally substituted and is optionally heteroatom containing; in the presence of
         (3) a dehydrocoupling catalyst effective to convert at least about 20% of the Si—H groups to Si—O— groups, provided that no more than 50% of the newly formed Si—O bonds of the uncured silicon-containing polymer product units have the structure —[Si($R^1$)$O_{1.5}$]—; and
         (4) an optional inert solvent;
      (ii) an optional particulate filler; and
      (iii) an optional compatible solvent; and
   (b) curing the applied coating formulation at a curing temperature for a predetermined curing time and optionally in the presence of a curing catalyst, wherein the curing temperature is below the temperature required for pyrolysis and conversion of the silicon-containing polymer to a ceramic product.

2. The method of claim 1, further comprising drying the applied coating formulation prior to curing the applied coating formulation.

3. The method of claim 1, wherein the dehydrocoupling catalyst is effective to convert at least about 90 mol % of the Si—H groups to Si—OH groups, Si—$OR^{10}$ groups, Si—O—Si crosslinking groups, or a combination thereof.

4. The method of claim 1, wherein the second reagent comprises $H_2O$, and wherein the molar amount of the $H_2O$ present in the reaction is equal to or greater than the molar amount of Si—H groups in the precursor polymer.

5. The method of claim 1, wherein the second reagent comprises $H_2O$ and $R^{10}OH$, and wherein the combined molar amount of $H_2O$ and $R^{10}OH$ present in the reaction is greater than the molar amount of Si—H groups in the precursor polymer.

6. The method of claim 1, wherein the second reagent comprises $H_2O$, and the molar amount of $H_2O$ present in the reaction is less than the molar amount of Si—H groups in the precursor polymer, and wherein the dehydrocoupling catalyst in the formulation is removed or deactivated prior to the applying to the substrate.

7. The method of claim 1, wherein the second reagent comprises one or more alcohols and $H_2O$, and wherein, in the reaction preparing the silicon-containing polymer, the one or more alcohols is combined with the precursor polymer and allowed to react for a predetermined period of time before $H_2O$ is added to the reaction or wherein the water and one or more alcohols are added to the precursor polymer at the same time.

8. The method of claim 1, wherein the second reagent comprises one or more alcohols and $H_2O$, and wherein the water and one or more alcohols are added simultaneously and the precursor polymer reacts predominantly with the $H_2O$.

9. The method of claim 1, wherein the dehydrocoupling catalyst is a transition metal catalyst.

10. The method of claim 1, wherein the reaction for preparing the curable silicon-containing polymer further comprises a hydrosilylation reaction, wherein the hydrosilylation reaction comprises reacting the precursor polymer with one or more alkenyl-containing reagents or carbonyl containing reagents in the presence of a hydrosilylation catalyst, and wherein the hydrosilylation reaction converts between 1% and 50% of the Si—H groups to Si—R or Si—OR groups, wherein R is selected from hydrocarbyl, heteroatom containing hydrocarbyl, substituted heteroatom containing hydrocarbyl, halocarbyl, organometallic, and organosilyl.

11. The method of claim 10, wherein the hydrosilylation catalyst and the dehydrocoupling catalyst are the same compound or are different compounds.

12. The method of claim 1, wherein the particulate filler is present and is selected from powders, nanoparticles, platelets, flakes, whiskers, fibrils and chopped fibers, each of which is formed from one or more materials selected from metals, metal oxides, mixed metal oxides, metal carbides, metal nitrides, metal oxynitrides, metal oxycarbides, metal carbonitrides, metal borides, metal aluminides, metal silicides, metal sulfides, carbon, organic and inorganic polymers, minerals, and a metal salt of a carbonate, a phosphate, a sulfate, a sulfite, a silicate, a tungstate, a titanate, a zirconate, or an aluminate tungstates, titanates, zirconates, or aluminates and combinations thereof.

13. The method of claim 12, wherein the particulate filler is a reactive filler, a pigment, a colorant, an acid- and/or base-resistant material, a corrosion inhibitor, a reinforcing material, a hardening material, a tribological material, or a combination thereof, or wherein the particulate filler is present in an amount effective to prevent substantially all cracking from occurring in the coating during the curing or from operation at elevated temperature.

14. The method of claim 1, wherein the method provides a substrate with a first coating layer, and wherein the method further comprises repeating the application procedure to form a subsequent coating layer either before or after the first coating layer has been cured,
   wherein the formulation of the first coating layer has at least one different component from the formulation of the subsequent coating layer.

15. The method of claim 1, wherein an hydrolysis-condensation or condensation catalyst selected from an acid, base, organo-titanium, tin, zinc, or zirconium compound is added to the formulation to accelerate the curing rate.

16. A method for coating a substrate surface, the method comprising:
(a) applying to the substrate the coating formulation of claim 1; and
(b) drying and curing the coating formulation applied in (a) at a temperature $T_1$ for a predetermined period of time and optionally at Temperature $T_2$ in the presence or the absence of a curing catalyst, wherein $T_2$ is lower or equal to $T_1$ and $T_1$ and $T_2$ are below the temperature required for pyrolysis of the silicon-containing polymer.

* * * * *